(12) United States Patent
Xu et al.

(10) Patent No.: US 12,063,533 B2
(45) Date of Patent: Aug. 13, 2024

(54) DISCONTINUOUS RECEPTION METHOD, RELATED APPARATUS AND SYSTEM

(71) Applicant: Huawei Technologies Co., Ltd., Shenzhen (CN)

(72) Inventors: Haibo Xu, Beijing (CN); Xiao Xiao, Shenzhen (CN); Dongdong Wei, Shanghai (CN); Junren Chang, Beijing (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 356 days.

(21) Appl. No.: 17/635,654

(22) PCT Filed: Aug. 14, 2020

(86) PCT No.: PCT/CN2020/109378
§ 371 (c)(1),
(2) Date: Feb. 15, 2022

(87) PCT Pub. No.: WO2021/032026
PCT Pub. Date: Feb. 25, 2021

(65) Prior Publication Data
US 2022/0312241 A1    Sep. 29, 2022

(30) Foreign Application Priority Data
Aug. 16, 2019    (CN) .......................... 201910772053.8

(51) Int. Cl.
*H04W 24/08* (2009.01)
*H04L 1/08* (2006.01)
(Continued)

(52) U.S. Cl.
CPC .............. *H04W 24/08* (2013.01); *H04L 1/08* (2013.01); *H04L 1/1812* (2013.01);
(Continued)

(58) Field of Classification Search
CPC ... H04W 24/08; H04W 72/044; H04W 72/23; H04W 76/28; H04W 92/18; H04W 72/20;
(Continued)

(56) References Cited

U.S. PATENT DOCUMENTS

| 10,594,447 B2 | 3/2020 | Wang et al. |
| 2019/0158229 A1 | 5/2019 | Wei et al. |

(Continued)

FOREIGN PATENT DOCUMENTS

| CN | 107211362 A | 9/2017 |
| CN | 107592984 A | 1/2018 |

(Continued)

OTHER PUBLICATIONS

Ericsson et al., "Running MAC CR for LAA", May 13, 2016, 3GPP TSG-RAN WG2 Meeting #94, May 23-27, 2016, R2-164013, 78 pages, Nanjing, P.R. China.

(Continued)

*Primary Examiner* — Harry H Kim
(74) *Attorney, Agent, or Firm* — Slater Matsil, LLP

(57) ABSTRACT

This application relates to a discontinuous reception method. In the first time unit, for example, the first symbol, after a hybrid automatic repeat request HARQ feedback occasion of a sidelink HARQ process, a first terminal may start a drx-HARQ-RTT-TimerSL and start a drx-Retransmission-TimerSL when the drx-HARQ-RTT-TimerSL expires. During running of the drx-RetransmissionTimerSL, the first terminal monitors a physical downlink control channel. In this way, sidelink retransmission efficiency can be improved, an increase of a sidelink retransmission delay can be avoided, and sidelink-based applications, such as unmanned driving, automatic driving, assisted driving, intelligent driv- (Continued)

ing, networked driving, intelligent networked driving, and car sharing in the field of artificial intelligence can be better supported.

20 Claims, 18 Drawing Sheets

(51) Int. Cl.
*H04L 1/1812* (2023.01)
*H04L 1/1822* (2023.01)
*H04L 1/1829* (2023.01)
*H04L 1/1867* (2023.01)
*H04L 5/00* (2006.01)
*H04L 27/26* (2006.01)
*H04W 4/44* (2018.01)
*H04W 4/46* (2018.01)
*H04W 72/044* (2023.01)
*H04W 72/0453* (2023.01)
*H04W 72/20* (2023.01)
*H04W 72/23* (2023.01)
*H04W 76/28* (2018.01)
*H04W 92/18* (2009.01)

(52) U.S. Cl.
CPC ...... *H04L 5/0053* (2013.01); *H04L 27/26025* (2021.01); *H04W 72/044* (2013.01); *H04W 72/23* (2023.01); *H04W 76/28* (2018.02); *H04W 92/18* (2013.01)

(58) Field of Classification Search
CPC ..... H04W 4/46; H04W 4/44; H04W 72/0453; H04L 1/08; H04L 1/1812; H04L 5/0053; H04L 27/26025; H04L 1/1883; H04L 1/1854; H04L 1/1896; H04L 1/1822; H04L 1/1851; Y02D 30/70
See application file for complete search history.

(56) References Cited

U.S. PATENT DOCUMENTS

| | | | |
|---|---|---|---|
| 2021/0328726 A1* | 10/2021 | Wei | H04L 1/1848 |
| 2023/0019726 A1* | 1/2023 | Kwon | H04L 1/0026 |
| 2023/0074206 A1* | 3/2023 | Zhang | H04L 1/1848 |
| 2023/0247550 A1* | 8/2023 | Yu | H04W 52/0216 |
| | | | 370/311 |

FOREIGN PATENT DOCUMENTS

| | | |
|---|---|---|
| WO | 2018061759 A1 | 4/2018 |
| WO | 2019101146 A1 | 5/2019 |

OTHER PUBLICATIONS

"DRX Related Timers in NR," Agenda Item: 10.3.1.10 (NR_NEWrat-Core), Source: LG Electronics Inc., Document for: Discussion and Decision, 3GPP TSG-RAN2 Meeting #99, R2-1708755 (revision of R2-1706750), Berlin, Germany, Aug. 21-25, 2017, 3 pages.
LG Electronics Inc. et al., "Reconsideration on drx-Inactivity Timer for NB-IoT", 3GPP TSG-RAN WG2 Meeting #94, R2-164202, May 23-27, 2016, 6 pages, Nanjing, China.
Huawei, HiSilicon, "Draft CR on TS 38.321 on the remaining MAC Open issues for 5G V2X with NR SL", 3GPP TSG-RAN WG2 Meeting #109-bis electronic, R2-2003556 , Apr. 20-30, 2020 , 20 pages.

* cited by examiner

DISCONTINUOUS RECEPTION METHOD, RELATED APPARATUS AND SYSTEM

CROSS-REFERENCE TO RELATED APPLICATIONS

This application is a national stage of International Application No. PCT/CN2020/109378, filed on Aug. 14, 2020, which claims priority to Chinese Patent Application No. 201910772053.8, filed on Aug. 16, 2019, and entitled "DISCONTINUOUS RECEPTION METHOD, RELATED APPARATUS AND SYSTEM". Both of the aforementioned applications are hereby incorporated by reference in their entireties.

TECHNICAL FIELD

This application relates to the field of wireless communications technologies, and in particular, to a discontinuous reception method, a related apparatus, and a system.

BACKGROUND

In a long term evolution (long term evolution, LTE) system or a new radio (new radio, NR) system, a communications interface between user equipment (user equipment, UE) and a base station (eNB/gNB) is referred to as a Uu interface. A communications interface between UEs is referred to as a PC5 interface. On the Uu interface, a link through which the UE sends data to the base station is referred to as an uplink (Uplink), and a link through which the UE receives data sent by the base station is referred to as a downlink (Downlink). A link for data transmission between UEs on the PC5 interface is referred to as a sidelink (Sidelink). The PC5 interface is usually used in a scenario in which direct communication can be performed between devices, for example, a vehicle to everything (vehicle to everything, V2X) scenario, or a device to device (device to device, D2D) scenario.

There are two sidelink resource allocation manners. One allocation manner is that the UE autonomously selects a resource from a resource pool, that is, the UE selects a resource from a resource pool configured or preconfigured by using a system message or dedicated signaling in a network to transmit sidelink data. The other resource allocation manner is based on base station scheduling, that is, the base station schedules a sidelink resource for user equipment TX UE to transmit sidelink data. In this sidelink resource allocation manner based on base station scheduling, the base station delivers downlink control information (downlink control information, DCI) on a physical downlink control channel (physical downlink control channel, PDCCH) to dynamically allocate resources, and the TX UE needs to monitor the PDCCH to obtain a grant (grant) delivered by the base station.

On the Uu interface, to reduce power consumption caused by the UE continuously monitoring the PDCCH, a method currently applied in 3GPP is using a discontinuous reception (discontinuous reception, DRX) mechanism. However, in a sidelink retransmission scenario, when the base station delivers a PDCCH used to schedule sidelink data retransmission, the existing DRX mechanism may cause TX UE that has entered a sleep mode stops monitoring the PDCCH. As a result, data retransmission of the TX UE on a sidelink is delayed.

SUMMARY

This application provides a discontinuous reception method, a related apparatus, and a system, to improve data retransmission efficiency on a sidelink, and avoid an increase of delay of data retransmission on the sidelink.

According to a first aspect, this application provides a discontinuous reception method. The method may include: In the first time unit (for example, the first symbol) after a HARQ feedback occasion of a first sidelink HARQ process, a first apparatus may start a drx-HARQ-RTT-TimerSL. If the drx-HARQ-RTT-TimerSL expires and a HARQ feedback of the first sidelink HARQ process is not acknowledgement NACK, the first apparatus starts a drx-RetransmissionTimerSL. The first apparatus monitors a physical downlink control channel PDCCH during running of the drx-RetransmissionTimerSL.

The first apparatus may be a terminal device, for example, user equipment such as a mobile phone, a wearable device, or a vehicle, or a chip that may be disposed on the terminal device.

The first sidelink HARQ process is associated with first data. The drx-HARQ-RTT-TimerSL and the drx-RetransmissionTimerSL are associated with the first sidelink HARQ process.

The first sidelink HARQ process may be used by the first apparatus (TX UE) to send the first data to a second apparatus (RX UE). The HARQ feedback occasion may be used by the first apparatus to send the HARQ feedback of the first sidelink HARQ process to a network device. The HARQ feedback may be used to indicate whether receiving for previous transmission of the first sidelink HARQ process succeeds. The HARQ feedback being NACK may indicate that receiving for the previous transmission of the first sidelink HARQ process fails.

In the first aspect, a time unit may be a symbol or a slot. Lengths of the symbol and the slot may depend on a parameter set Numerology of a bandwidth part BWP of a sidelink used to transmit the data. The lengths of the symbol and the slot may also depend on a parameter set Numerology of a bandwidth part BWP of an uplink through which the HARQ feedback is sent by the first apparatus to the network device.

In the first aspect, an RRC connection is established between the first apparatus and the network device. The first apparatus is in an RRC connected mode. A sidelink is established between the first apparatus and the second apparatus. The network device configures a DRX cycle for the first apparatus in the RRC connected mode. The DRX cycle consists of "On Duration" and "Opportunity for DRX". Within the "On Duration", the first apparatus monitors and receives the PDCCH (an active mode). Within the "Opportunity for DRX", the first apparatus does not receive downlink channel data to reduce power consumption (a sleep mode).

In the first aspect, the network device configures timers for the first apparatus in the RRC connected mode: a drx-InactivityTimer, a drx-HARQ-RTT-TimerSL, and a drx-RetransmissionTimerSL. The drx-HARQ-RTT-TimerSL may be referred to as a first timer, and the drx-RetransmissionTimerSL may be referred to as a second timer.

In the first aspect, the first apparatus may further send a resource scheduling request to the network device, to request the network device to schedule a transmission resource for transmission of the first data. Correspondingly, after receiving the resource scheduling request, the network device may schedule a resource for sidelink transmission, and deliver the scheduled resource in the PDCCH. The first apparatus may obtain, by monitoring the PDCCH, the resource scheduled by the network device.

In an implementation of the method provided in the first aspect, the first apparatus may start the drx-HARQ-RTT-TimerSL in the first time unit after the HARQ feedback occasion of the first sidelink HARQ process, and when the drx-HARQ-RTT-TimerSL expires, start the drx-RetransmissionTimerSL. In other words, after the HARQ feedback occasion, during running of the drx-RetransmissionTimerSL, the first apparatus is in the active mode, and may monitor and receive the PDCCH that is delivered by the network device during the running and that is used to schedule a first sidelink HARQ process retransmission. In this way, efficiency of the first sidelink HARQ process retransmission can be improved, and an increase of delay of sidelink data retransmission is avoided.

With reference to the first aspect, in some embodiments, a specific implementation in which the first apparatus starts the first timer may include: If the HARQ feedback is NACK, the first apparatus starts the first timer in the first time unit after the HARQ feedback occasion of the first sidelink HARQ process.

With reference to the first aspect, in some embodiments, when the first apparatus detects a first PDCCH, the first apparatus may stop the second timer. The first PDCCH is used to schedule a transmission resource of the first sidelink HARQ process.

With reference to the first aspect, in some embodiments, before the HARQ feedback occasion of the first sidelink HARQ process, the first apparatus may further monitor a second PDCCH. The second PDCCH is used to indicate a resource scheduled by the network device for the previous transmission of the first sidelink HARQ process.

With reference to the first aspect, in some embodiments, the first apparatus can determine the HARQ feedback of the first sidelink HARQ process in the following manner.

(1) In any one of the following cases, the first apparatus can determine that the HARQ feedback of the first sidelink HARQ process is NACK, that is, determine that receiving for the previous transmission of the first sidelink HARQ process fails.

Case 1: The HARQ feedback that is received by the first apparatus and sent by the second apparatus is NACK.

The HARQ feedback is used to indicate whether receiving by the second apparatus for the previous transmission of data associated with the first sidelink HARQ process succeeds. The HARQ feedback being NACK may indicate that the second apparatus fails to receive the data associated with the first sidelink HARQ process. A reason why the second apparatus fails to receive the data associated with the first sidelink HARQ process may include but is not limited to: the second apparatus fails to decode the data. Herein, a first resource is the resource scheduled by the network device for the previous transmission of the first sidelink HARQ process.

Case 2: The first apparatus fails to receive the HARQ feedback sent by the second apparatus.

In case 2, S108 in FIG. 3A does not exist. The failure of the first apparatus to receive the HARQ feedback sent by the second apparatus may specifically mean that the first apparatus fails to receive, on the feedback occasion of the first sidelink HARQ process, the HARQ feedback sent by the second apparatus. The feedback occasion of the first sidelink HARQ process may be configured by the network device.

Case 3: The first apparatus fails to transmit the sidelink data to the second apparatus on the first resource.

In case 3, S107 in FIG. 3A does not exist, and correspondingly, S108 does not exist. Herein, a first resource is the resource scheduled by the network device for the previous transmission of the first sidelink HARQ process. A cause of the Case 3 may be a resource conflict. To be specific, the first apparatus transmits other data on the first resource instead of data a.

(2) In the following cases, the first apparatus can determine that the HARQ feedback of the first sidelink HARQ process is ACK, that is, determine that receiving for the previous transmission of the first sidelink HARQ process succeeds.

The HARQ feedback that is received by the first apparatus and sent by the second apparatus is ACK. The HARQ feedback being ACK may indicate that the second apparatus successfully receives data associated with the first sidelink HARQ process.

With reference to the first aspect, in some embodiments, the first apparatus may maintain the two timers, namely, the drx-HARQ-RTT-TimerSL and the drx-RetransmissionTimerSL in the following manners.

Manner 1

In the first time unit after the HARQ feedback occasion of the first sidelink HARQ process, the first apparatus may start the drx-HARQ-RTT-TimerSL. If the HARQ feedback of the first sidelink HARQ process is NACK, the first apparatus may start the drx-RetransmissionTimerSL when the drx-HARQ-RTT-TimerSL expires. The first apparatus monitors the PDCCH during running of the drx-RetransmissionTimerSL.

Manner 2

If the HARQ feedback of the first sidelink HARQ process is NACK, the first apparatus may start the drx-HARQ-RTT-TimerSL in the first time unit after the HARQ feedback occasion of the first sidelink HARQ process. When the drx-HARQ-RTT-TimerSL expires, the first apparatus may start the drx-RetransmissionTimerSL. The first apparatus monitors the PDCCH during running of the drx-RetransmissionTimerSL.

In addition to the HARQ feedback of the first sidelink HARQ process, a state variable SL_HARQ_FEEDBACK associated with the first sidelink HARQ process may also be used to indicate whether receiving for the previous transmission of the first sidelink HARQ process succeeds. The state variable SL_HARQ_FEEDBACK may be referred to as a first variable.

The maintenance manner is not limited to the foregoing Manner 1 and Manner 2. The first apparatus may also maintain the drx-HARQ-RTT-TimerSL and the drx-RetransmissionTimerSL based on the state variable SL_HARQ_FEEDBACK associated with the first sidelink HARQ process. A specific implementation may be as follows. If the state variable SL_HARQ_FEEDBACK associated with the first sidelink HARQ process is NACK, the first apparatus may start the drx-HARQ-RTT-TimerSL in the first time unit after the HARQ feedback occasion of the first sidelink HARQ process. If the state variable SL_HARQ_FEEDBACK associated with the first sidelink HARQ process is NACK, the first apparatus may start the drx-RetransmissionTimerSL when the drx-HARQ-RTT-TimerSL expires.

With reference to the first aspect, in some embodiments, units of timing of the two timers, namely, the drx-HARQ-RTT-TimerSL and the drx-RetransmissionTimerSL may be implemented in the following manners.

Manner 1: A unit of the drx-HARQ-RTT-TimerSL is a symbol (symbol), and a unit of the drx-RetransmissionTimerSL is a slot (slot). Lengths of the symbol and the slot may depend on a parameter set Numerology of a bandwidth part BWP of a sidelink used to transmit the data.

Manner 2: The unit of the drx-HARQ-RTT-TimerSL is a symbol (symbol), and the unit of the drx-Retransmission-TimerSL is a slot (slot). The lengths of the symbol and the slot may also depend on a parameter set Numerology of a bandwidth part BWP of an uplink through which the HARQ feedback is sent by the first apparatus to the network device.

Manner 3: The units of the two timers may be absolute time lengths, for example, millisecond ms.

According to a second aspect, this application provides an apparatus, and the apparatus may be the first apparatus in the first aspect. The apparatus may include a plurality of functional units, to implement the method described in the first aspect. The apparatus may include a processing unit and a communications unit. The processing unit may be a processor, or a unit including one or more modules with a processing capability. The communications unit may be a transceiver, or a unit including one or more modules with a transceiver function.

The processing unit may be configured to start a first timer in the first time unit after a hybrid automatic repeat request HARQ feedback occasion of a first sidelink HARQ process. The processing unit may be further configured to start a second timer if the first timer expires and a HARQ feedback is NACK.

The communications unit may be configured to monitor a PDCCH during running of the second timer.

The first timer and the second timer are associated with the first sidelink HARQ process. The first sidelink HARQ process is associated with first data. The first sidelink HARQ process is used by the first apparatus to send the first data to a second apparatus. The HARQ feedback occasion is used by the first apparatus to send the HARQ feedback of the first sidelink HARQ process to a network device. The HARQ feedback is used to indicate whether receiving for previous transmission of the first sidelink HARQ process succeeds.

With reference to the second aspect, in some embodiments, the processing unit may be specifically configured to: if the HARQ feedback is NACK, start the first timer in the first time unit after the HARQ feedback occasion of the first sidelink HARQ process.

With reference to the second aspect, in some embodiments, for how the processing unit determines that the HARQ feedback of the first sidelink HARQ process is NACK, refer to related content in the first aspect. Details are not described herein again.

With reference to the second aspect, in some embodiments, the first sidelink HARQ process is associated with a first variable, and the first variable is used to record whether receiving for the previous transmission of the first sidelink HARQ process succeeds. The first variable being NACK indicates that the previous transmission of the first sidelink HARQ process fails.

With reference to the second aspect, in some embodiments, the processing unit may be specifically configured to: if the first variable is NACK, start the first timer in the first time unit after the HARQ feedback occasion of the first sidelink HARQ process.

With reference to the second aspect, in some embodiments, the processing unit may be specifically configured to start the second timer if the first timer expires and the first variable is NACK.

With reference to the second aspect, in some embodiments, the processing unit may be specifically further configured to stop the second timer when the first apparatus detects a first PDCCH. The first PDCCH is used to schedule a transmission resource of the first sidelink HARQ process.

With reference to the second aspect, in some embodiments, the communications unit may be further configured to monitor a second PDCCH before the HARQ feedback occasion of the first sidelink HARQ process. The second PDCCH is used to indicate a resource scheduled by the network device for the previous transmission of the first sidelink HARQ process.

With reference to the second aspect, in some embodiments, the communications unit may be further configured to: send the HARQ feedback of the first sidelink HARQ process to the network device on the HARQ feedback occasion; or transmit second data on the HARQ feedback occasion, where the second data is not the HARQ feedback of the first sidelink HARQ process.

For details not mentioned in the second aspect, refer to the first aspect. Details are not described herein again.

According to a third aspect, an apparatus is provided. The apparatus may be the first apparatus in the first aspect, and may be configured to perform the discontinuous reception method described in the first aspect. The apparatus may be referred to as a first apparatus. The first apparatus may include a memory, and a processor, a transmitter, and a receiver that are coupled to the memory. The transmitter is configured to send a signal to another wireless communications device. The receiver is configured to receive a signal sent by the another wireless communications device. The memory is configured to store implementation code of the discontinuous reception method described in the first aspect. The processor is configured to execute program code stored in the memory, that is, execute the discontinuous reception method described in any one of the possible implementations of the first aspect.

Specifically, the processor may be configured to start a first timer in the first time unit after a hybrid automatic repeat request HARQ feedback occasion of a first sidelink HARQ process. The processor may be further configured to start a second timer if the first timer expires and a HARQ feedback is NACK.

Specifically, the receiver may be configured to monitor a PDCCH during running of the second timer.

Specifically, the transmitter may be configured to transmit first data to a second apparatus by using the first Sidelink HARQ process.

The first timer and the second timer are associated with the first sidelink HARQ process. The first sidelink HARQ process is associated with the first data. The first sidelink HARQ process is used by the first apparatus to send the first data to the second apparatus. The HARQ feedback occasion is used by the first apparatus to send the HARQ feedback of the first sidelink HARQ process to a network device. The HARQ feedback is used to indicate whether receiving for previous transmission of the first sidelink HARQ process succeeds.

With reference to the third aspect, in some embodiments, the processor may be specifically configured to: if the HARQ feedback is NACK, start the first timer in the first time unit after the HARQ feedback occasion of the first sidelink HARQ process.

With reference to the third aspect, in some embodiments, for how the processor determines that the HARQ feedback of the first sidelink HARQ process is NACK, refer to related content in the first aspect. Details are not described herein again.

With reference to the third aspect, in some embodiments, the first sidelink HARQ process is associated with a first variable, and the first variable is used to record whether receiving for the previous transmission of the first sidelink HARQ process succeeds. The first variable being NACK indicates that the previous transmission of the first sidelink HARQ process fails.

With reference to the third aspect, in some embodiments, the processor may be specifically configured to: if the first variable is NACK, start the first timer in the first time unit after the HARQ feedback occasion of the first sidelink HARQ process.

With reference to the third aspect, in some embodiments, the processor may be specifically configured to start the second timer if the first timer expires and the first variable is NACK.

With reference to the third aspect, in some embodiments, the processor may be specifically further configured to stop the second timer when the first apparatus detects a first PDCCH. The first PDCCH is used to schedule a transmission resource of the first sidelink HARQ process.

With reference to the third aspect, in some embodiments, the receiver may be further configured to monitor a second PDCCH before the HARQ feedback occasion of the first sidelink HARQ process. The second PDCCH is used to indicate a resource scheduled by the network device for the previous transmission of the first sidelink HARQ process.

With reference to the third aspect, in some embodiments, the transmitter may be further configured to: send the HARQ feedback of the first sidelink HARQ process to the network device on the HARQ feedback occasion; or transmit second data on the HARQ feedback occasion, where the second data is not the HARQ feedback of the first sidelink HARQ process.

For details not mentioned in the third aspect, refer to the first aspect. Details are not described herein again.

According to a fourth aspect, this application provides a discontinuous reception method. The method may include: In the first time unit (for example, the first symbol) after a HARQ feedback occasion of a first sidelink HARQ process, a first apparatus may start a drx-RetransmissionTimerSL. The first apparatus monitors a physical downlink control channel PDCCH during running of the drx-RetransmissionTimerSL.

The first sidelink HARQ process is associated with first data. The drx-RetransmissionTimerSL is associated with the first sidelink HARQ process.

The first sidelink HARQ process may be used by the first apparatus (TX UE) to send the first data to a second apparatus (RX UE). The HARQ feedback occasion may be used by the first apparatus to send the HARQ feedback of the first sidelink HARQ process to a network device. The HARQ feedback may be used to indicate whether receiving for previous transmission of the first sidelink HARQ process succeeds. The HARQ feedback being NACK may indicate that receiving for the previous transmission of the first sidelink HARQ process fails.

The first apparatus may be a terminal device, for example, user equipment such as a mobile phone, a wearable device, or a vehicle, or a chip that may be disposed on the terminal device.

In the fourth aspect, a time unit may be a symbol or a slot. Lengths of the symbol and the slot may depend on a parameter set Numerology of a bandwidth part BWP of a sidelink used to transmit the data. The lengths of the symbol and the slot may also depend on a parameter set Numerology of a bandwidth part BWP of an uplink through which the HARQ feedback is sent by the first apparatus to the network device.

In the fourth aspect, an RRC connection is established between the first apparatus and the network device. The first apparatus is in an RRC connected mode. A sidelink is established between the first apparatus and the second apparatus. The network device configures a DRX cycle for the first apparatus in the RRC connected mode. The DRX cycle consists of "On Duration" and "Opportunity for DRX". Within the "On Duration", the first apparatus monitors and receives the PDCCH (an active mode). Within the "Opportunity for DRX", the first apparatus does not receive downlink channel data to reduce power consumption (a sleep mode).

In the fourth aspect, the network device configures timers for the first apparatus in the RRC connected mode: a drx-InactivityTimer and a drx-RetransmissionTimerSL. The drx-RetransmissionTimerSL may be referred to as a third timer.

In the fourth aspect, the first apparatus may further send a resource scheduling request to the network device, to request the network device to schedule a transmission resource for transmission of the first data. Correspondingly, after receiving the resource scheduling request, the network device may schedule a resource for sidelink transmission, and deliver the scheduled resource in the PDCCH. The first apparatus may obtain, by monitoring the PDCCH, the resource scheduled by the network device.

In an implementation of the method provided in the fourth aspect, in the first time unit after the HARQ feedback occasion of the first sidelink HARQ process, the first apparatus may start the drx-RetransmissionTimerSL. The first apparatus monitors the PDCCH during running of the drx-RetransmissionTimerSL. In other words, from the first time unit of the HARQ feedback occasion, the first apparatus is in the active mode, and may detect the PDCCH that is delivered by the network device and that is used to schedule a first sidelink HARQ process retransmission. In this way, efficiency of the first sidelink HARQ process retransmission can be improved, and an increase of delay of sidelink data retransmission is avoided.

With reference to the fourth aspect, in some embodiments, a specific implementation in which the first apparatus starts the first timer may include: If the HARQ feedback is NACK, the first apparatus starts the third timer in the first time unit after the HARQ feedback occasion of the first sidelink HARQ process.

With reference to the fourth aspect, in some embodiments, when the first apparatus detects a first PDCCH, the first apparatus may stop the third timer. The first PDCCH is used to schedule a transmission resource of the first sidelink HARQ process.

With reference to the fourth aspect, in some embodiments, before the HARQ feedback occasion of the first sidelink HARQ process, the first apparatus may further monitor a second PDCCH. The second PDCCH is used to indicate a resource scheduled by the network device for the previous transmission of the first sidelink HARQ process.

In the fourth aspect, for an implementation in which the first apparatus determines the HARQ feedback of the first sidelink HARQ process, refer to related content in the first aspect. Details are not described herein again.

In addition to the HARQ feedback of the first sidelink HARQ process, a state variable SL_HARQ_FEEDBACK associated with the first sidelink HARQ process may also be used to indicate whether receiving for the previous transmission of the first sidelink HARQ process succeeds.

In addition to the HARQ feedback of the first sidelink HARQ process, the first apparatus may also maintain the drx-RetransmissionTimerSL based on the state variable SL_HARQ_FEEDBACK associated with the first sidelink HARQ process. A specific implementation may be as follows. If the state variable SL_HARQ_FEEDBACK associated with the first sidelink HARQ process is NACK, the first apparatus may start the drx-RetransmissionTimerSL in the first time unit after the HARQ feedback occasion of the first sidelink HARQ process.

With reference to the fourth aspect, in some embodiments, a unit of timing of the timer drx-RetransmissionTimerSL may be implemented in the following manners.

Manner 1: The unit of the drx-RetransmissionTimerSL may be a slot (slot). A length of the slot may depend on a parameter set Numerology of a bandwidth part BWP of a sidelink used to transmit the data.

Manner 2: The unit of the drx-RetransmissionTimerSL may be a slot (slot). The length of the slot may also depend on a parameter set Numerology of a bandwidth part BWP of an uplink through which the HARQ feedback is sent by the first apparatus to the network device.

Manner 3: The unit of the timer may be an absolute time length, for example, millisecond ms.

According to a fifth aspect, this application provides an apparatus, and the apparatus may be the first apparatus in the fourth aspect. The apparatus may include a plurality of functional units, to implement the method described in the fourth aspect. The apparatus may include a processing unit and a communications unit. The processing unit may be a processor, or a unit including one or more modules with a processing capability. The communications unit may be a transceiver, or a unit including one or more modules with a transceiver function.

The processing unit may be configured to start a third timer in the first time unit after a hybrid automatic repeat request HARQ feedback occasion of a first sidelink HARQ process.

The communications unit may be configured to monitor a PDCCH during running of the third timer.

The third timer is associated with the first sidelink HARQ process. The first sidelink HARQ process is associated with the first data. The first sidelink HARQ process is used by the first apparatus to send the first data to the second apparatus. The HARQ feedback occasion is used by the first apparatus to send a HARQ feedback of the first sidelink HARQ process to a network device. The HARQ feedback is used to indicate whether receiving for previous transmission of the first sidelink HARQ process succeeds.

With reference to the fifth aspect, in some embodiments, the processing unit may be specifically configured to: if the HARQ feedback is NACK, start the third timer in the first time unit after the HARQ feedback occasion of the first sidelink HARQ process.

With reference to the fifth aspect, in some embodiments, the processing unit may be specifically configured to: if the HARQ feedback is NACK, start the third timer in the first time unit after the HARQ feedback occasion of the first sidelink HARQ process.

With reference to the fifth aspect, in some embodiments, for how the processing unit determines that the HARQ feedback of the first sidelink HARQ process is NACK, refer to related content in the first aspect. Details are not described herein again. With reference to the fifth aspect, in some embodiments, the first sidelink HARQ process is associated with a first variable, and the first variable is used to record whether receiving for the previous transmission of the first sidelink HARQ process succeeds. The first variable being NACK indicates that the previous transmission of the first sidelink HARQ process fails.

With reference to the fifth aspect, in some embodiments, the processing unit may be specifically configured to: if the first variable is NACK, start the third timer in the first time unit after the HARQ feedback occasion of the first sidelink HARQ process.

With reference to the fifth aspect, in some embodiments, the processing unit may be specifically further configured to stop the third timer when the first apparatus detects a first PDCCH. The first PDCCH is used to schedule a transmission resource of the first sidelink HARQ process.

With reference to the fifth aspect, in some embodiments, the communications unit may be further configured to monitor a second PDCCH before the HARQ feedback occasion of the first sidelink HARQ process. The second PDCCH is used to indicate a resource scheduled by the network device for the previous transmission of the first sidelink HARQ process.

With reference to the fifth aspect, in some embodiments, the communications unit may be further configured to: send the HARQ feedback of the first sidelink HARQ process to the network device on the HARQ feedback occasion; or transmit second data on the HARQ feedback occasion, where the second data is not the HARQ feedback of the first sidelink HARQ process.

For details not mentioned in the fifth aspect, refer to the fourth aspect. Details are not described herein again.

According to a sixth aspect, an apparatus is provided. The apparatus may be the first apparatus in the fourth aspect, and may be configured to perform the discontinuous reception method described in the fourth aspect. The apparatus may be referred to as a first apparatus. The first apparatus may include a memory, and a processor, a transmitter, and a receiver that are coupled to the memory. The transmitter is configured to send a signal to another wireless communications device. The receiver is configured to receive a signal sent by the another wireless communications device. The memory is configured to store implementation code of the discontinuous reception method described in the fourth aspect. The processor is configured to execute program code stored in the memory, that is, execute the discontinuous reception method described in any one of the possible implementations of the fourth aspect.

Specifically, the processor may be configured to start a third timer in the first time unit after a hybrid automatic repeat request HARQ feedback occasion of a first sidelink HARQ process.

Specifically, the receiver may be configured to monitor a PDCCH during running of the third timer.

Specifically, the transmitter may be configured to transmit first data to a second apparatus by using the first Sidelink HARQ process.

The third timer is associated with the first sidelink HARQ process. The first sidelink HARQ process is associated with the first data. The first sidelink HARQ process is used by the first apparatus to send the first data to the second apparatus. The HARQ feedback occasion is used by the first apparatus to send a HARQ feedback of the first sidelink HARQ process to a network device. The HARQ feedback is used to indicate whether receiving for previous transmission of the first sidelink HARQ process succeeds.

With reference to the sixth aspect, in some embodiments, the processor may be specifically configured to: if the HARQ feedback is NACK, start the third timer in the first time unit after the HARQ feedback occasion of the first sidelink HARQ process.

With reference to the sixth aspect, in some embodiments, the processor may be specifically configured to: if the HARQ feedback is NACK, start the third timer in the first time unit after the HARQ feedback occasion of the first sidelink HARQ process.

With reference to the sixth aspect, in some embodiments, for how the processor determines that the HARQ feedback of the first sidelink HARQ process is NACK, refer to related content in the first aspect. Details are not described herein again.

With reference to the sixth aspect, in some embodiments, the first sidelink HARQ process is associated with a first variable, and the first variable is used to record whether receiving for the previous transmission of the first sidelink HARQ process succeeds. The first variable being NACK indicates that the previous transmission of the first sidelink HARQ process fails.

With reference to the sixth aspect, in some embodiments, the processor may be specifically configured to: if the first variable is NACK, start the third timer in the first time unit after the HARQ feedback occasion of the first sidelink HARQ process.

With reference to the sixth aspect, in some embodiments, the processor may be specifically further configured to stop the third timer when a first PDCCH is detected. The first PDCCH is used to schedule a transmission resource of the first sidelink HARQ process.

With reference to the sixth aspect, in some embodiments, the receiver may be further configured to monitor a second PDCCH before the HARQ feedback occasion of the first sidelink HARQ process. The second PDCCH is used to indicate a resource scheduled by the network device for the previous transmission of the first sidelink HARQ process.

With reference to the sixth aspect, in some embodiments, the transmitter may be further configured to: send the HARQ feedback of the first sidelink HARQ process to the network device on the HARQ feedback occasion; or transmit second data on the HARQ feedback occasion, where the second data is not the HARQ feedback of the first sidelink HARQ process.

For details not mentioned in the sixth aspect, refer to the fourth aspect. Details are not described herein again.

According to a seventh aspect, this application provides a discontinuous reception method. The method may include: If receiving for previous transmission of a first sidelink HARQ process fails, a first apparatus may start to monitor a physical downlink control channel PDCCH in the first time unit (for example, the first symbol) after a HARQ feedback occasion of the first sidelink HARQ process. The first apparatus stops monitoring the PDCCH when the first apparatus detects a first PDCCH and none of the following conditions is met.

Condition 1: One or more of the following timers are running: drx-onDurationTimer; drx-InactivityTimer; drx-RetransmissionTimerDL; drx-RetransmissionTimerUL; and ra-ContentionResolutionTimer.

Condition 2: The first apparatus sends a scheduling request on a PUCCH, and the scheduling request is pending.

Condition 3: The first apparatus receives a non-contention-based random access response message, but does not receive the PDCCH that is scrambled by a C-RNTI and that indicates a new transmission.

The first PDCCH is used to schedule a transmission resource of the first sidelink HARQ process.

The first sidelink HARQ process is associated with first data. The drx-RetransmissionTimerSL is associated with the first sidelink HARQ process. The first sidelink HARQ process may be used by the first apparatus (TX UE) to send the first data to a second apparatus (RX UE). The HARQ feedback occasion may be used by the first apparatus to send the HARQ feedback of the first sidelink HARQ process to a network device. The HARQ feedback may be used to indicate whether receiving for previous transmission of the first sidelink HARQ process succeeds. The HARQ feedback being NACK may indicate that receiving for the previous transmission of the first sidelink HARQ process fails.

The first apparatus may be a terminal device, for example, user equipment such as a mobile phone, a wearable device, or a vehicle, or a chip that may be disposed on the terminal device.

In the seventh aspect, a time unit may be a symbol or a slot. Lengths of the symbol and the slot may depend on a parameter set Numerology of a bandwidth part BWP of a sidelink used to transmit the data. The lengths of the symbol and the slot may also depend on a parameter set Numerology of a bandwidth part BWP of an uplink through which the HARQ feedback is sent by the first apparatus to the network device.

In the seventh aspect, an RRC connection is established between the first apparatus and the network device. The first apparatus is in an RRC connected mode. A sidelink is established between the first apparatus and the second apparatus. The network device configures a DRX cycle for the first apparatus in the RRC connected mode. The DRX cycle consists of "On Duration" and "Opportunity for DRX". Within the "On Duration", the first apparatus monitors and receives the PDCCH (an active mode). Within the "Opportunity for DRX", the first apparatus does not receive downlink channel data to reduce power consumption (a sleep mode).

In the seventh aspect, the network device configures timers for the first apparatus in the RRC connected mode: the drx-InactivityTimer and the drx-RetransmissionTimerSL. The drx-RetransmissionTimerSL may be referred to as a third timer.

In the seventh aspect, the first apparatus may further send a resource scheduling request to the network device, to request the network device to schedule a transmission resource for transmission of the first data. Correspondingly, after receiving the resource scheduling request, the network device may schedule a resource for sidelink transmission, and deliver the scheduled resource in the PDCCH. The first apparatus may obtain, by monitoring the PDCCH, the resource scheduled by the network device.

In an implementation of the method provided in the seventh aspect, if receiving for the previous transmission of the first sidelink HARQ process fails, the first apparatus may start to monitor the PDCCH in the first time unit after the HARQ feedback occasion of the first sidelink HARQ process. To be specific, if receiving for the previous transmission of the first sidelink HARQ process fails, after the HARQ feedback occasion, the first apparatus is in the active mode, and may monitor and receive the PDCCH that is delivered by the network device and that is used to schedule a first sidelink HARQ process retransmission. In this way, efficiency of the first sidelink HARQ process retransmission can be improved, and an increase of delay of sidelink data retransmission is avoided.

With reference to the seventh aspect, in some embodiments, whether the previous transmission of the first sidelink HARQ process is received may be determined from the following two aspects:
the HARQ feedback of the first sidelink HARQ process; and
a state variable SL_HARQ_FEEDBACK associated with the first sidelink HARQ process.

The HARQ feedback of the first sidelink HARQ process being NACK may indicate that receiving for the previous transmission of the first sidelink HARQ process fails. The HARQ feedback of the first sidelink HARQ process being ACK may indicate that receiving for the previous transmission of the first sidelink HARQ process succeeds.

A value of the state variable SL_HARQ_FEEDBACK associated with the first sidelink HARQ process being NACK may indicate that receiving for the previous transmission of the first sidelink HARQ process fails. The value of the state variable SL_HARQ_FEEDBACK associated with the first sidelink HARQ process being ACK may indicate that receiving for the previous transmission of the first sidelink HARQ process succeeds.

In the seventh aspect, for a specific implementation in which the first apparatus determines the HARQ feedback of the first sidelink HARQ process, refer to related content in the first aspect. Details are not described herein again.

In the seventh aspect, the first apparatus may monitor the PDCCH based on the HARQ feedback of the first sidelink HARQ process. A specific implementation may be as follows. If the HARQ feedback of the first sidelink HARQ process is NACK, the first apparatus may start to monitor the PDCCH in the first time unit after the HARQ feedback occasion of the first sidelink HARQ process.

In the seventh aspect, the first apparatus may also monitor the PDCCH based on the state variable SL_HARQ_FEEDBACK associated with the first sidelink HARQ process. A specific implementation may be as follows. If the state variable SL_HARQ_FEEDBACK associated with the first sidelink HARQ process is NACK, the first apparatus may start to monitor the PDCCH in the first time unit after the HARQ feedback occasion of the first sidelink HARQ process.

With reference to the seventh aspect, in some embodiments, if the state variable SL_HARQ_FEEDBACK associated with the first sidelink HARQ process is ACK, and none of the following conditions is met, the first apparatus may stop monitoring the PDCCH.

Condition 1: One or more of the following timers are running: drx-onDurationTimer; drx-InactivityTimer; drx-RetransmissionTimerDL; drx-RetransmissionTimerUL; and ra-ContentionResolutionTimer.

Condition 2: The first apparatus sends a scheduling request on a PUCCH, and the scheduling request is pending.

Condition 3: The first apparatus receives a non-contention-based random access response message, but does not receive the PDCCH that is scrambled by a C-RNTI and that indicates a new transmission.

With reference to the seventh aspect, in some embodiments, the state variable SL_HARQ_FEEDBACK associated with the first sidelink HARQ process is NACK, however, a state variable CURRENT_SL_TX_NB associated with the first sidelink HARQ process indicates that a quantity of transmission times of data a reaches a maximum. In this case, when none of the following conditions is met, the first apparatus may stop monitoring the PDCCH.

Condition 1: One or more of the following timers are running: drx-onDurationTimer; drx-InactivityTimer; drx-RetransmissionTimerDL; drx-RetransmissionTimerUL; and ra-ContentionResolutionTimer.

Condition 2: The first apparatus sends a scheduling request on a PUCCH, and the scheduling request is pending.

Condition 3: The first apparatus receives a non-contention-based random access response message, but does not receive the PDCCH that is scrambled by a C-RNTI and that indicates a new transmission.

According to an eighth aspect, this application provides an apparatus, and the apparatus may be the first apparatus in the seventh aspect. The apparatus may include a plurality of functional units, to implement the method described in the seventh aspect. The apparatus may include a processing unit and a communications unit. The processing unit may be a processor, or a unit including one or more modules with a processing capability. The communications unit may be a transceiver, or a unit including one or more modules with a transceiver function.

The processing unit may be configured to determine whether receiving for previous transmission of a first sidelink HARQ process succeeds.

The communications unit may be configured to start to monitor a physical downlink control channel PDCCH in the first time unit (for example, the first symbol) after a HARQ feedback occasion of the first sidelink HARQ process, if receiving for the previous transmission of the first sidelink HARQ process fails.

The communications unit may further be configured to stop monitoring the PDCCH when the first apparatus detects a first PDCCH and none of the following conditions is met.

Condition 1: One or more of the following timers are running: drx-onDurationTimer; drx-InactivityTimer; drx-RetransmissionTimerDL; drx-RetransmissionTimerUL; and ra-ContentionResolutionTimer.

Condition 2: The first apparatus sends a scheduling request on a PUCCH, and the scheduling request is pending.

Condition 3: The first apparatus receives a non-contention-based random access response message, but does not receive the PDCCH that is scrambled by a C-RNTI and that indicates a new transmission.

With reference to the eighth aspect, in some embodiments, whether the previous transmission of the first sidelink HARQ process is received may be determined by the processing unit from the following two aspects:
  a HARQ feedback of the first sidelink HARQ process; and
  a state variable SL_HARQ_FEEDBACK associated with the first sidelink HARQ process.

The HARQ feedback of the first sidelink HARQ process being NACK may indicate that receiving for the previous transmission of the first sidelink HARQ process fails. The HARQ feedback of the first sidelink HARQ process being ACK may indicate that receiving for the previous transmission of the first sidelink HARQ process succeeds.

A value of the state variable SL_HARQ_FEEDBACK associated with the first sidelink HARQ process being NACK may indicate that receiving for the previous transmission of the first sidelink HARQ process fails. The value of the state variable SL_HARQ_FEEDBACK associated with the first sidelink HARQ process being ACK may indicate that receiving for the previous transmission of the first sidelink HARQ process succeeds.

In the eighth aspect, for a specific implementation in which the processing unit determines the HARQ feedback of the first sidelink HARQ process, refer to related content in the first aspect. Details are not described herein again.

In the eighth aspect, the processing unit may monitor the PDCCH based on the HARQ feedback of the first sidelink HARQ process. A specific implementation may be as follows. If the HARQ feedback of the first sidelink HARQ process is NACK, the communications unit may start to monitor the PDCCH in the first time unit after the HARQ feedback occasion of the first sidelink HARQ process.

In the eighth aspect, the communications unit may also monitor the PDCCH based on the state variable SL_HAR- Q_FEEDBACK associated with the first sidelink HARQ process. A specific implementation may be as follows. If the state variable SL_HARQ_FEEDBACK associated with the first sidelink HARQ process is NACK, the communications unit may start to monitor the PDCCH in the first time unit after the HARQ feedback occasion of the first sidelink HARQ process.

With reference to the eighth aspect, in some embodiments, if the state variable SL_HARQ_FEEDBACK associated with the first sidelink HARQ process is ACK, and none of the following conditions is met, the communications unit may stop monitoring the PDCCH.

Condition 1: One or more of the following timers are running: drx-onDurationTimer; drx-InactivityTimer; drx-RetransmissionTimerDL; drx-RetransmissionTimerUL; and ra-ContentionResolutionTimer.

Condition 2: The first apparatus sends a scheduling request on a PUCCH, and the scheduling request is pending.

Condition 3: The first apparatus receives a non-contention-based random access response message, but does not receive the PDCCH that is scrambled by a C-RNTI and that indicates a new transmission.

With reference to the eighth aspect, in some embodiments, the state variable SL_HARQ_FEEDBACK associated with the first sidelink HARQ process is NACK, however, a state variable CURRENT_SL_TX_NB associated with the first sidelink HARQ process indicates that a quantity of transmission times of data a reaches a maximum. In this case, when none of the following conditions is met, the communications unit may stop monitoring the PDCCH.

Condition 1: One or more of the following timers are running: drx-onDurationTimer; drx-InactivityTimer; drx-RetransmissionTimerDL; drx-RetransmissionTimerUL; and ra-ContentionResolutionTimer.

Condition 2: The first apparatus sends a scheduling request on a PUCCH, and the scheduling request is pending.

Condition 3: The first apparatus receives a non-contention-based random access response message, but does not receive the PDCCH that is scrambled by a C-RNTI and that indicates a new transmission.

For details not mentioned in the eighth aspect, refer to the seventh aspect. Details are not described herein again.

According to a ninth aspect, an apparatus is provided. The apparatus may be the first apparatus in the seventh aspect, and may be configured to perform the discontinuous reception method described in the seventh aspect. The apparatus may be referred to as a first apparatus. The first apparatus may include a memory, and a processor, a transmitter, and a receiver that are coupled to the memory. The transmitter is configured to send a signal to another wireless communications device. The receiver is configured to receive a signal sent by the another wireless communications device. The memory is configured to store implementation code of the discontinuous reception method described in the seventh aspect. The processor is configured to execute program code stored in the memory, that is, execute the discontinuous reception method described in any one of the possible implementations of the seventh aspect.

Specifically, the processor may be configured to determine whether receiving for previous transmission of a first sidelink HARQ process succeeds.

Specifically, the receiver may be configured to start to monitor a physical downlink control channel PDCCH in the first time unit (for example, the first symbol) after a HARQ feedback occasion of the first sidelink HARQ process, if receiving for the previous transmission of the first sidelink HARQ process fails.

Specifically, the receiver may further be configured to stop monitoring the PDCCH when the first apparatus detects a first PDCCH and none of the following conditions is met.

Condition 1: One or more of the following timers are running: drx-onDurationTimer; drx-InactivityTimer; drx-RetransmissionTimerDL; drx-RetransmissionTimerUL; and ra-ContentionResolutionTimer.

Condition 2: The first apparatus sends a scheduling request on a PUCCH, and the scheduling request is pending.

Condition 3: The first apparatus receives a non-contention-based random access response message, but does not receive the PDCCH that is scrambled by a C-RNTI and that indicates a new transmission.

With reference to the ninth aspect, in some embodiments, the receiver may monitor the PDCCH based on a HARQ feedback of the first sidelink HARQ process. A specific implementation may be as follows. If the HARQ feedback of the first sidelink HARQ process is NACK, the receiver may start to monitor the PDCCH in the first time unit after the HARQ feedback occasion of the first sidelink HARQ process.

With reference to the ninth aspect, in some embodiments, the receiver may monitor the PDCCH based on a state variable SL_HARQ_FEEDBACK associated with the first sidelink HARQ process. A specific implementation may be as follows. If the state variable SL_HARQ_FEEDBACK associated with the first sidelink HARQ process is NACK, the receiver may start to monitor the PDCCH in the first time unit after the HARQ feedback occasion of the first sidelink HARQ process.

With reference to the ninth aspect, in some embodiments, if the state variable SL_HARQ_FEEDBACK associated with the first sidelink HARQ process is ACK, and none of the following conditions is met, the receiver may stop monitoring the PDCCH.

Condition 1: One or more of the following timers are running: drx-onDurationTimer; drx-InactivityTimer; drx-RetransmissionTimerDL; drx-RetransmissionTimerUL; and ra-ContentionResolutionTimer.

Condition 2: The first apparatus sends a scheduling request on a PUCCH, and the scheduling request is pending.

Condition 3: The first apparatus receives a non-contention-based random access response message, but does not receive the PDCCH that is scrambled by a C-RNTI and that indicates a new transmission.

With reference to the ninth aspect, in some embodiments, the state variable SL_HARQ_FEEDBACK associated with the first sidelink HARQ process is NACK, however, a state variable CURRENT_SL_TX_NB associated with the first sidelink HARQ process indicates that a quantity of transmission times of data a reaches a maximum. In this case, when none of the following conditions is met, the receiver may stop monitoring the PDCCH.

Condition 1: One or more of the following timers are running: drx-onDurationTimer; drx-InactivityTimer; drx-RetransmissionTimerDL; drx-RetransmissionTimerUL; and ra-ContentionResolutionTimer.

Condition 2: The first apparatus sends a scheduling request on a PUCCH, and the scheduling request is pending.

Condition 3: The first apparatus receives a non-contention-based random access response message, but does not receive the PDCCH that is scrambled by a C-RNTI and that indicates a new transmission.

For details not mentioned in the ninth aspect, refer to the seventh aspect. Details are not described herein again.

The following describes several aspects (1) to (3) related to the first aspect, the fourth aspect, and the seventh aspect.

(1) The State Variable SL_HARQ_FEEDBACK Associated with the First Sidelink HARQ Process With reference to the first aspect, the fourth aspect, and the seventh aspect, an initial value of the state variable SL_HARQ_FEEDBACK associated with the first sidelink HARQ process may be set to ACK. The SL_HARQ_FEEDBACK being ACK may indicate that receiving for the previous transmission of the first sidelink HARQ process succeeds. The SL_HARQ_FEEDBACK being NACK may indicate that receiving for the previous transmission of the first sidelink HARQ process fails.

The following describes how the first apparatus maintains the state variable SL_HARQ_FEEDBACK associated with the first sidelink HARQ process.

1. The first apparatus may set the SL_HARQ_FEEDBACK to ACK in any one of the following cases.

Case 1: The HARQ feedback that is received by the first apparatus and sent by the second apparatus is ACK.

Case 2: The first apparatus monitors and receives the PDCCH used to schedule transmission (including initial transmission and retransmission) of the first sidelink HARQ process.

2. The first apparatus may set the SL_HARQ_FEEDBACK to NACK in any one of the following cases.

Case 1: The HARQ feedback that is received by the first apparatus and sent by the second apparatus is NACK.

Case 2: The first apparatus fails to receive the HARQ feedback sent by the second apparatus.

The failure of the first apparatus to receive the HARQ feedback sent by the second apparatus may specifically mean that the first apparatus fails to receive the HARQ feedback sent by the second apparatus on the HARQ feedback occasion.

Case 3: The first apparatus fails to transmit, to the second apparatus, the data a associated with the first sidelink HARQ process on the transmission resource allocated to the first sidelink HARQ process.

Herein, the transmission resource allocated to the first sidelink HARQ process may be used for the initial transmission or the retransmission of the first sidelink HARQ process. A cause of Case 3 may be a resource conflict. To be specific, the first apparatus transmits other data on the transmission resource allocated to the first sidelink HARQ process instead of the data a.

(2) The State Variable CURRENT_SL_TX_NB Associated with the First Sidelink HARQ Process With reference to the first aspect, the fourth aspect, and the seventh aspect, an initial value of the state variable CURRENT_SL_TX_NB associated with the first sidelink HARQ process may be set to 0. Each time the first apparatus monitors and receives the PDCCH used to schedule the transmission (including the initial transmission and the retransmission) of the first sidelink HARQ process, the first apparatus may increase the CURRENT_SL_TX_NB associated with the first sidelink HARQ process by 1. The PDCCH used to schedule the transmission of the first sidelink HARQ process may indicate the transmission resource allocated by the network device to the first sidelink HARQ process.

(3) The Lengths of the Symbol and the S101

With reference to the first aspect, the fourth aspect, and the seventh aspect, the lengths of the symbol and the slot may depend on the parameter set Numerology of the bandwidth part BWP of the sidelink used to transmit the first data, for example, subcarrier space (subcarrier space, SCS). This is not limited thereto. The lengths of the symbol and the slot may also depend on the parameter set Numerology, for example, SCS, of the bandwidth part BWP of the uplink through which the HARQ feedback is sent by the first apparatus to the network device.

According to a tenth aspect, an apparatus is provided. The apparatus may include a processor and a memory. The processor is coupled to the memory that stores instructions. The processor is configured to invoke the instructions in the memory, to enable the apparatus to perform the discontinuous reception method described in the first aspect, the fourth aspect, or the seventh aspect.

According to an eleventh aspect, a computer-readable storage medium is provided. The readable storage medium stores instructions, and when the instructions are run on a computer, the computer is enabled to perform the discontinuous reception method described in the first aspect, the fourth aspect, or the seventh aspect.

According to a twelfth aspect, a computer program product including instructions is provided. When the computer program product is run on a computer, the computer is enabled to perform the discontinuous reception method described in the first aspect, the fourth aspect, or the seventh aspect.

BRIEF DESCRIPTION OF THE DRAWINGS

To describe technical solutions in embodiments or the background of this application more clearly, the following describes the accompanying drawings used in the embodiments or the background of this application.

DETAILED DESCRIPTION OF ILLUSTRATIVE EMBODIMENTS

Terms used in the embodiments of this application are only used to explain specific embodiments of this application, but are not intended to limit this application.

Figure 1:
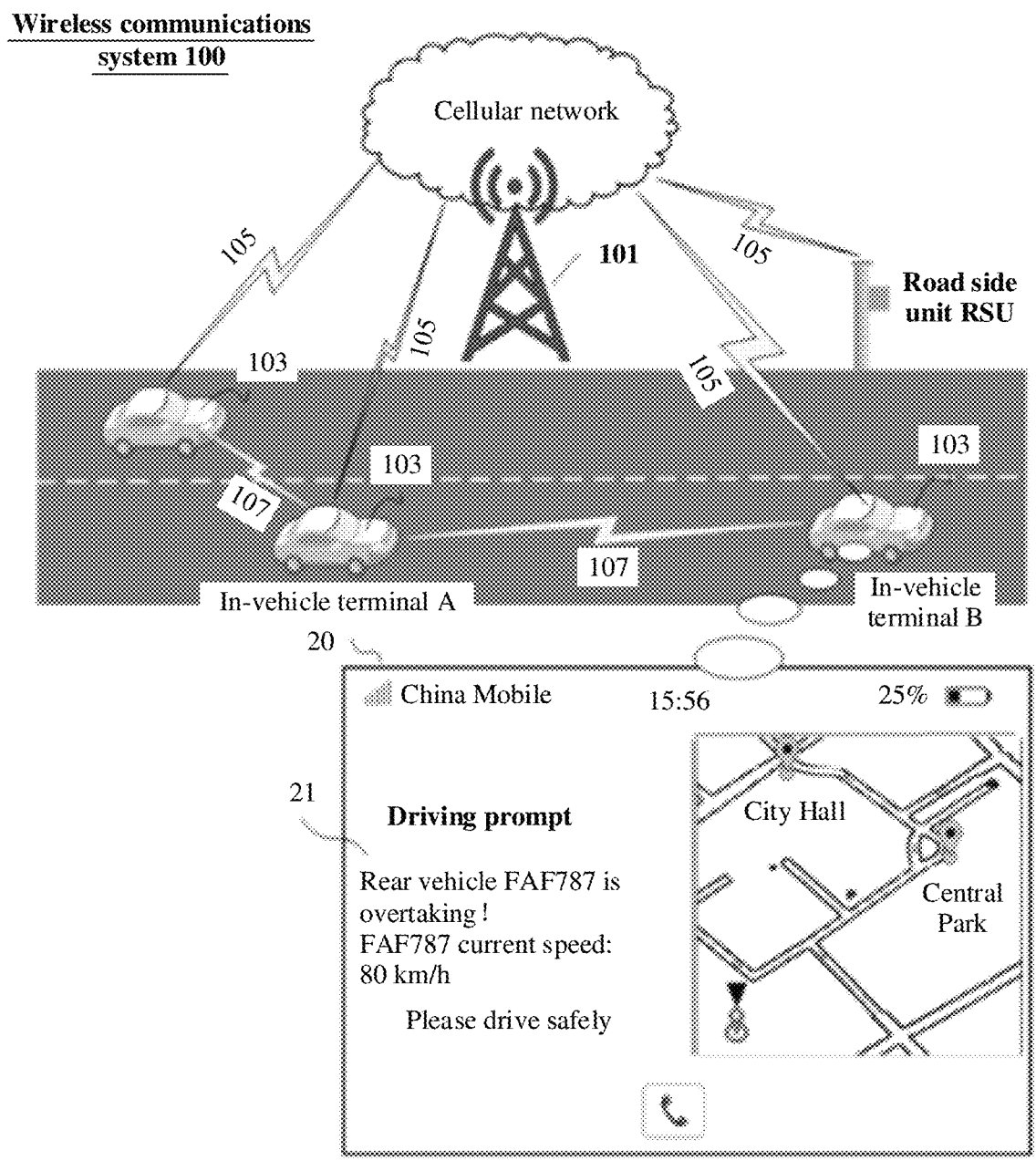
FIG. 1 is a schematic diagram of an architecture of a wireless communications system according to this application.

FIG. 1 shows a wireless communications system 100 according to this application. The wireless communications system 100 may be a long term evolution (LTE) system, a fifth generation mobile communications (5G) system, a new radio (NR) system, or may be a machine to machine (machine to machine, M2M) communications system, a future evolved sixth generation communications system, or the like. As shown in FIG. 1, the wireless communications system 100 may include one or more network devices 101, two or more user equipments 103, and a core network (not shown).

The network device 101 may be configured to communicate with the user equipment 103 through a Uu interface 105 under control of a network device controller (not shown), for example, a base station controller (base station controller, BSC). On the Uu interface 105, a link through which the user equipment 103 sends data to the network device 101 is referred to as an uplink (Uplink), and a link through which the user equipment 103 receives data sent by the network device 100 is referred to as a downlink (Downlink). In some embodiments, the network device controller may be a part of the core network, or may be integrated into the network device 101.

The network device 101 may be further configured to transmit control information or user data to the core network through a backhaul (backhaul) interface, for example, an Si interface.

Network devices 101 may also directly or indirectly communicate with each other through the backhaul (backhaul) interface, for example, an X2 interface.

A communications interface 107 between the user equipments 103 is referred to as a PC5 interface. On the PC5 interface 107, a link for transmitting data between the user equipments 103 is referred to as a sidelink (Sidelink). When the user equipment 103 is in an evolved universal terrestrial radio access network (Evolved Universal Terrestrial Radio Access Network, E-UTRAN) coverage area, the user equipment 103 may use the Uu interface 105 under control of a cellular network. Regardless of whether the user equipment 103 is in the E-UTRAN coverage area, the user equipment 103 may perform sidelink communication through the PC5 interface 107. Sidelink communication may be point-to-point communication between two user equipments 103, or may be multicast communication performed by a group of more than two user equipments 103.

The network device 101 may be a base transceiver station (Base Transceiver Station, BTS) in a time division synchronous code division multiple access (Time Division Synchronous Code Division Multiple Access, TD-SCDMA) system, an evolved NodeB (Evolved NodeB, eNodeB) in an LTE system, a base station in a 5G system or a new radio (NR) system, or the like. In addition, the base station may be an access point (Access Point, AP), a transmission reception point (Trans TRP), a central unit (Central Unit, CU), or another network entity, and may include some or all of functions of the foregoing network entities.

The user equipment 103 may be a wireless communications device, for example, an in-vehicle terminal, a smartphone, a road side unit (road side unit, RSU), an Internet of Things terminal device, or a machine type communications (Machine Type Communications, MTC) terminal. The user equipment may further include one or more base stations having some UE functions, for example, a micro base station. The user equipments may be distributed throughout the wireless communications system 100, and may be stationary or mobile.

It should be noted that the wireless communications system 100 shown in FIG. 1 is only intended to describe the technical solutions of this application more clearly, but is not intended to limit this application. A person of ordinary skill in the art may know that as a network architecture evolves and a new service scenario emerges, the technical solutions provided in this application are also applicable to a similar technical problem.

Sidelink communication is usually applicable to scenarios in which devices such as V2X devices are directly connected to and communicate with each other. V2X refers to connecting a vehicle to a network or connecting vehicles to form a network. There are four different types of applications: vehicle to vehicle (vehicle to vehicle, V2V), vehicle to infrastructure (vehicle to infrastructure, V2I), vehicle to network (vehicle to network, V2N), and vehicle to pedestrian (vehicle to pedestrian, V2P). Through the four applications, vehicles, roadside infrastructure, application servers, and pedestrians collect, process, and share status information about ambient vehicles and environments, so that smarter services are provided, such as unmanned driving (unmanned driving), automated driving (automated driving/ADS), driver assistance (driver assistance/ADAS), intelligent driving (intelligent driving), connected driving (connected driving), intelligent network driving (intelligent network driving), car sharing, and the like.

As shown in FIG. 1, in a V2V scenario, the user equipment 103 may be an in-vehicle terminal. On the PC5 interface 107, in-vehicle terminals may exchange data, such as data indicating vehicle movement, such as a vehicle location, a vehicle speed, and a driving direction through a sidelink. For example, an in-vehicle terminal A may send data to another in-vehicle terminal B through a sidelink, where the data is used to indicate driving movement of a vehicle in which the in-vehicle terminal A is located. In this sidelink communication, the in-vehicle terminal A is TX UE, and the in-vehicle terminal B is RX UE. After receiving the data, the in-vehicle terminal B may display a user interface 20. Content 21 represented by the data may be displayed in the user interface 20, such as a license plate number ("FAF787") of a rear vehicle, a driving operation ("Rear vehicle FAF787 is overtaking") being performed by the rear vehicle, a current speed ("80 km/h") of the rear vehicle, and so on. In this way, a traffic accident rate can be reduced and driving safety can be enhanced.

Currently, a main resource allocation manner for sidelink communication is a resource allocation manner based on base station scheduling. In this sidelink resource allocation manner, a base station delivers downlink control information DCI on a PDCCH to dynamically allocate resources, and the TX UE needs to monitor the PDCCH to obtain a grant (grant) delivered by the base station.

On the Uu interface 105, to reduce power consumption caused by the UE continuously monitoring the PDCCH, a solution currently used in 3GPP is a DRX mechanism. The following describes the existing DRX mechanism.

(i) Basic Working Principles of the DRX Mechanism

Figure 2A:
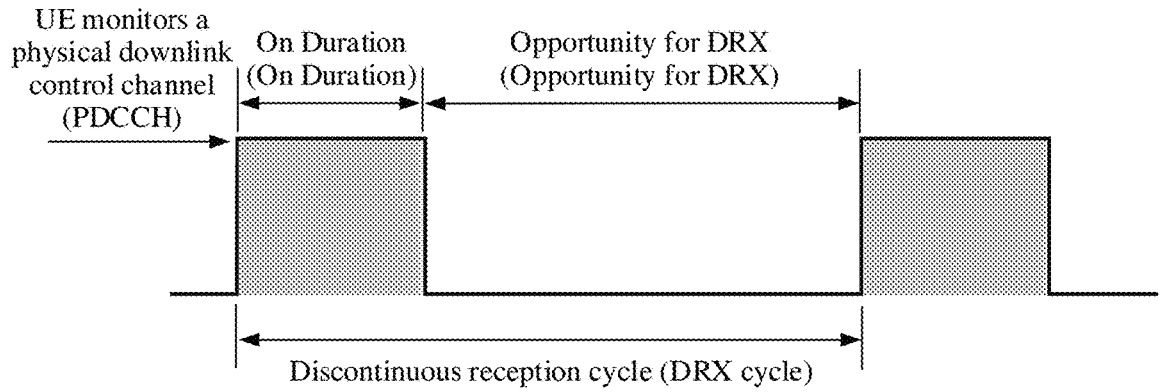
FIG. 2A is a schematic diagram of an existing DRX cycle.

As shown in FIG. 2A, in an LTE or NR system, the DRX mechanism is that a network device configures a DRX cycle (DRX cycle) for UE in a radio resource control (radio resource control, RRC) connected mode. The DRX cycle consists of two time periods that are "On Duration" and "Opportunity for DRX". The "On Duration" may be referred to as on duration and the "Opportunity for DRX" may be referred to as an opportunity for DRX. Within the "On Duration", the UE monitors and receives a PDCCH. Within the "Opportunity for DRX", the UE does not monitor the PDCCH, to reduce power consumption. A value of the "On Duration" (for example, 10 ms) specifies a time period in which the UE needs to monitor the PDCCH from a start point of the DRX cycle. The "On Duration" may be greater than or less than 1 ms. Within the "On Duration", the UE is in an active mode, that is, the UE monitors the PDCCH. During the "Opportunity for DRX", the UE is in a sleep mode, that is, the UE does not monitor the PDCCH. Herein, the sleep mode is only for monitoring the PDCCH, and indicates that the UE does not monitor the PDCCH. The UE in the sleep mode is still in the RRC connected mode, may transmit uplink data through a physical uplink control channel (physical uplink control channel, PUCCH), a physical uplink shared channel (physical uplink shared channel, PUSCH), or the like on the Uu interface 105, or receive downlink data sent by the base station through a physical downlink shared channel (physical downlink shared channel, PDSCH), and may further transmit sidelink data on the PC5 interface 107 through a physical sidelink shared channel (physical sidelink shared channel, PSSCH), a physical sidelink control channel (physical sidelink control channel, PSCCH), or the like.

(2) Introduction of Drx-InactivityTimer

Figure 2B:
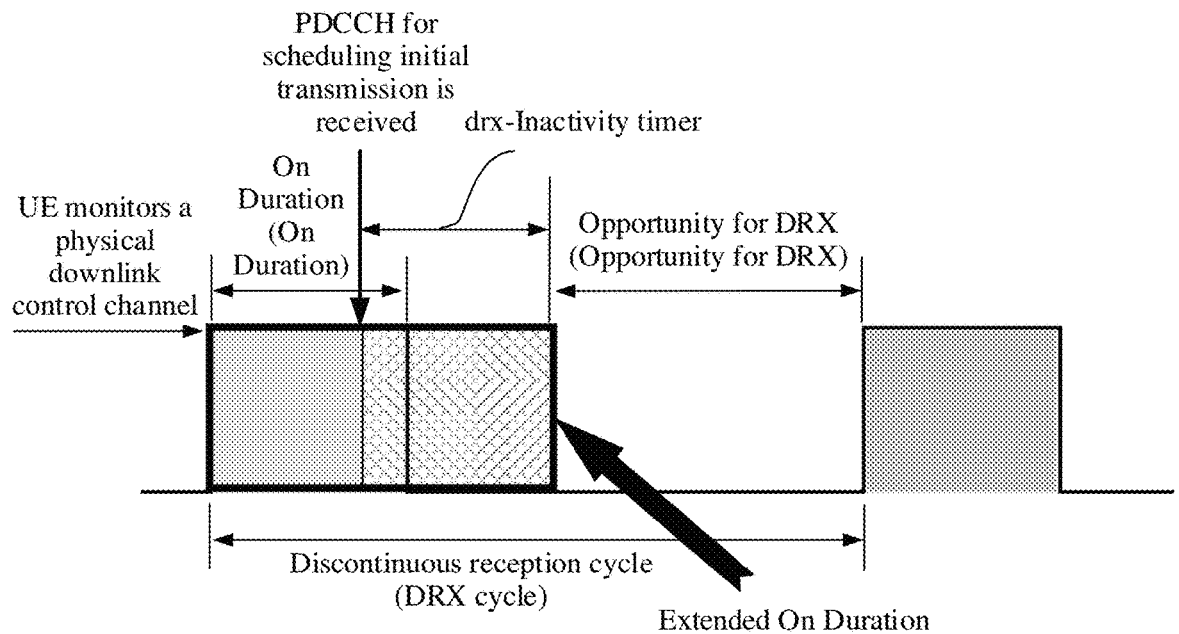
FIG. 2B is a schematic diagram of a DRX cycle in which a timer: drx-InactivityTimer is introduced.

In most cases, after UE is scheduled to receive or send data on a PDCCH occasion (Occasion), the UE is likely to continue to be scheduled in subsequent subframes (subframes), to complete receiving or sending of a piece of data of a large size. If the UE has entered the sleep mode, the UE needs to wait until a next DRX cycle before monitoring the PDCCH again to obtain a scheduled resource to receive or send subsequent data. This increases a delay in data transmission. To reduce the delay, the DRX mechanism introduces a timer: drx-InactivityTimer. As shown in FIG. 2B, when the UE monitors and receives a PDCCH used to schedule new data, the UE starts (or restarts) the timer: drx-InactivityTimer. The UE monitors the PDCCH in each subframe during running of the drx-InactivityTimer until the timer expires. Indication information of the new data is carried in the PDCCH and occupies one bit. It can be learned that, the introduction of the drx-InactivityTimer can ensure that the UE is in the active mode during the running of the drx-InactivityTimer and receives subsequent base station scheduling, which is equivalent to extending the "On Duration". If the UE continuously receives PDCCHs used to schedule different new data, the UE starts (or restarts) a plurality of drx-InactivityTimers successively, which may cause the UE to be in the active mode throughout the DRX cycle. That is, the "On Duration" may be extended to the entire DRX cycle.

(3) DRX

Figure 2C:
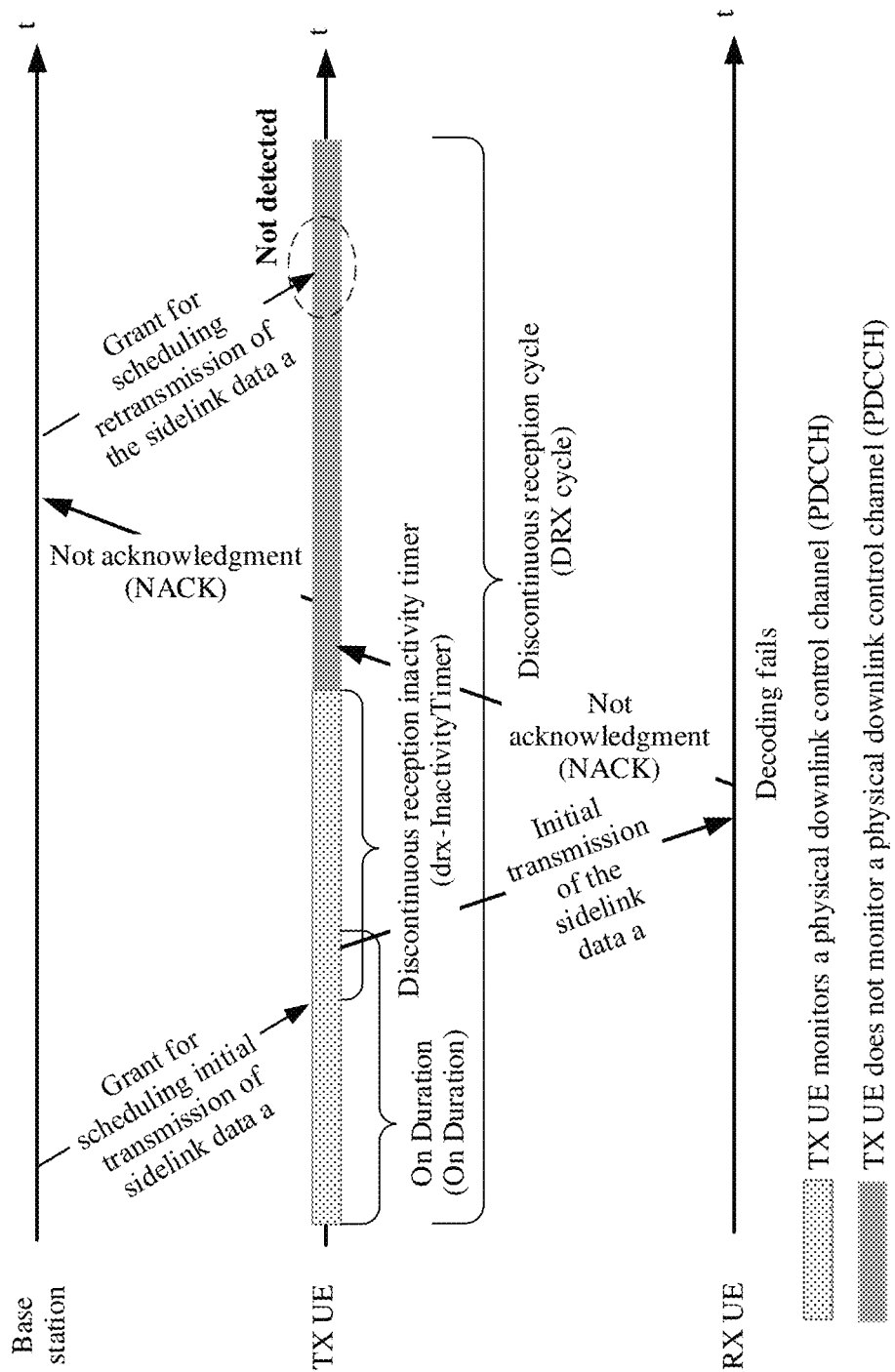
FIG. 2C is a schematic diagram of an existing sidelink DRX cycle.

In the LTE system, as shown in FIG. 2C, for a sidelink, the DRX mechanism on the Uu interface 105 is enhanced as follows. When the TX UE receives a PDCCH sent by a base station, and the PDCCH schedules an SLgrant used for new data transmission on the sidelink, the TX UE starts or restarts the drx-InactivityTimer. In this way, it can be ensured that the TX UE can be in the active mode and receive an SL grant scheduled subsequently by the base station.

In the NR system, if a base station configures a retransmission mechanism that is based on a sidelink hybrid automatic repeat request (hybrid automatic repeat request, HARQ) feedback for the TX UE, for the resource allocation manner based on base station scheduling, a possible HARQ working mode is: The base station schedules a retransmission resource for the TX UE based on a HARQ feedback (feedback) of sidelink data transmission. The HARQ feedback may be not acknowledgment (not acknowledgment, NACK) or acknowledgment (acknowledgment, ACK). As shown in FIG. 2C, if a HARQ feedback of data a is NACK, after receiving the NACK, the base station schedules a resource for retransmission of the data a, and delivers an SL grant used for the retransmission of the data a on a PDCCH.

However, as shown in FIG. 2C, when the HARQ feedback of the data a sent by the TX UE to the base station is NACK, the TX UE subsequently needs to receive the PDCCH that is delivered by the base station and that is used to schedule the retransmission of the data a, to retransmit the data a. However, based on the current DRX mechanism, when the base station delivers the PDCCH, the TX UE may have entered a DRX mode and no longer monitors the PDCCH. The TX UE needs to wait for an "On Duration" of a next DRX cycle to monitor the PDCCH and to receive the PDCCH that is delivered by the base station and that is used to schedule the retransmission of the data a, and then retransmits the data a. As a result, the data retransmission of the TX UE on the sidelink is delayed, and QoS requirements of traffic transmitted on the sidelink cannot be met.

To resolve the existing technical problem, according to the resource allocation manner based on base station scheduling, this application provides a discontinuous reception method, which helps reduce a delay of sidelink data transmission.

In the discontinuous reception method provided in this application, if it is determined that receiving for previous transmission of a specific piece of sidelink data fails, after a HARQ feedback occasion (feedback occasion) of a sidelink HARQ process associated with the sidelink data, when a network device delivers a PDCCH used to schedule a retransmission of the sidelink data, TX UE may be in an active mode, so that the TX UE may detect the PDCCH used to schedule the retransmission of the sidelink data without waiting for an "On Duration" of a next DRX cycle. Therefore, an increase of delay of sidelink data retransmission can be avoided.

In the discontinuous reception method provided in this application, the TX UE may set a sidelink HARQ process for each piece of sidelink data, for example, a MAC PDU transmitted by the TX UE to RX UE. That is, one sidelink HARQ process is associated with one piece of sidelink data, and the sidelink data may be stored in a sidelink HARQ buffer associated with the sidelink HARQ process. One sidelink HARQ process may maintain a state variable CURRENT_SL_TX_NB, and the state variable is used to indicate a quantity of transmission times of sidelink data associated with the sidelink HARQ process. The CURRENT_SL_TX_NB may be initialized to 0. The sidelink HARQ process may further maintain a state variable SL_HARQ_FEEDBACK, where the state variable is used to indicate a HARQ feedback of the sidelink data associated with the sidelink HARQ process.

The CURRENT_SL_TX_NB may be referred to as a first variable, and the SL_HARQ_FEEDBACK may be referred to as a second variable. This is not limited to the CURRENT_SL_TX_NB and the SL_HARQ_FEEDBACK. Naming of the first variable and the second variable may be different. This is not limited in this application.

A HARQ feedback occasion of a sidelink HARQ process associated with a piece of sidelink data may be used by the TX UE to send a HARQ feedback of the sidelink HARQ process to the network device. The HARQ feedback occasion is a time resource, and may be used to bear the HARQ feedback sent by the TX UE to the network device. The HARQ feedback may be used to indicate whether receiving for previous transmission of the sidelink HARQ process succeeds, that is, whether receiving for previous transmission of the sidelink data associated with the sidelink HARQ process succeeds. If the HARQ feedback is ACK, it may indicate that receiving for the previous transmission of the sidelink HARQ process succeeds. If the HARQ feedback is NACK, it may indicate that receiving for the previous transmission of the sidelink HARQ process fails. How to determine whether receiving for the previous transmission of the sidelink HARQ process succeeds is described later. Details are not described herein. The HARQ feedback occasion may be a symbol (symbol), or a time period including a plurality of consecutive symbols. The HARQ feedback occasion may be a slot (slot), or a time period including a plurality of consecutive slots.

The TX UE is in an RRC connected mode, and is configured with a DRX cycle. During a time period from start time of the DRX cycle, the TX UE is in the active mode and may monitor and receive a PDCCH. The PDCCH is used to schedule the previous transmission of the sidelink data. The previous transmission may be initial transmission (initial transmission) of the sidelink data, or may be the second transmission, the third transmission, or the like of the sidelink data. The previous transmission occurs before the HARQ feedback occasion, and is relative to a retransmission of the sidelink data after the HARQ feedback occasion.

Herein, a time period from the start time of the DRX cycle may be the "On Duration" of the DRX cycle, or may be extended "On Duration" formed after the drx-Inactivity-Timer is started. For an extension of the "On Duration", refer to related descriptions in FIG. 2B. That is, start time of the time period is the start time of the DRX cycle, and duration of the time period is greater than or equal to the "On Duration".

The sidelink data in this application may be data at a media access control (media access control, MAC) layer, for example, a MAC protocol data unit (protocol data unit, PDU).

In the discontinuous reception method provided in this application, the TX UE may be referred to as a first terminal, and the RX UE may be referred to as a second terminal.

The following describes in detail the technical solutions provided in this application by using a plurality of embodiments.

Embodiment 1

In this embodiment, for each sidelink HARQ process configured as a sidelink HARQ retransmission mechanism that is based on a HARQ feedback, a first terminal maintains two timers for each sidelink HARQ process: a first timer and a second timer. The first timer may be named drx-HARQ-RTT-TimerSL. The second timer may be named drx-RetransmissionTimerSL. During running of the second timer, the first terminal monitors a PDCCH. The first timer and the second timer may alternatively be named in another way. This is not limited in this application.

Figure 3A:
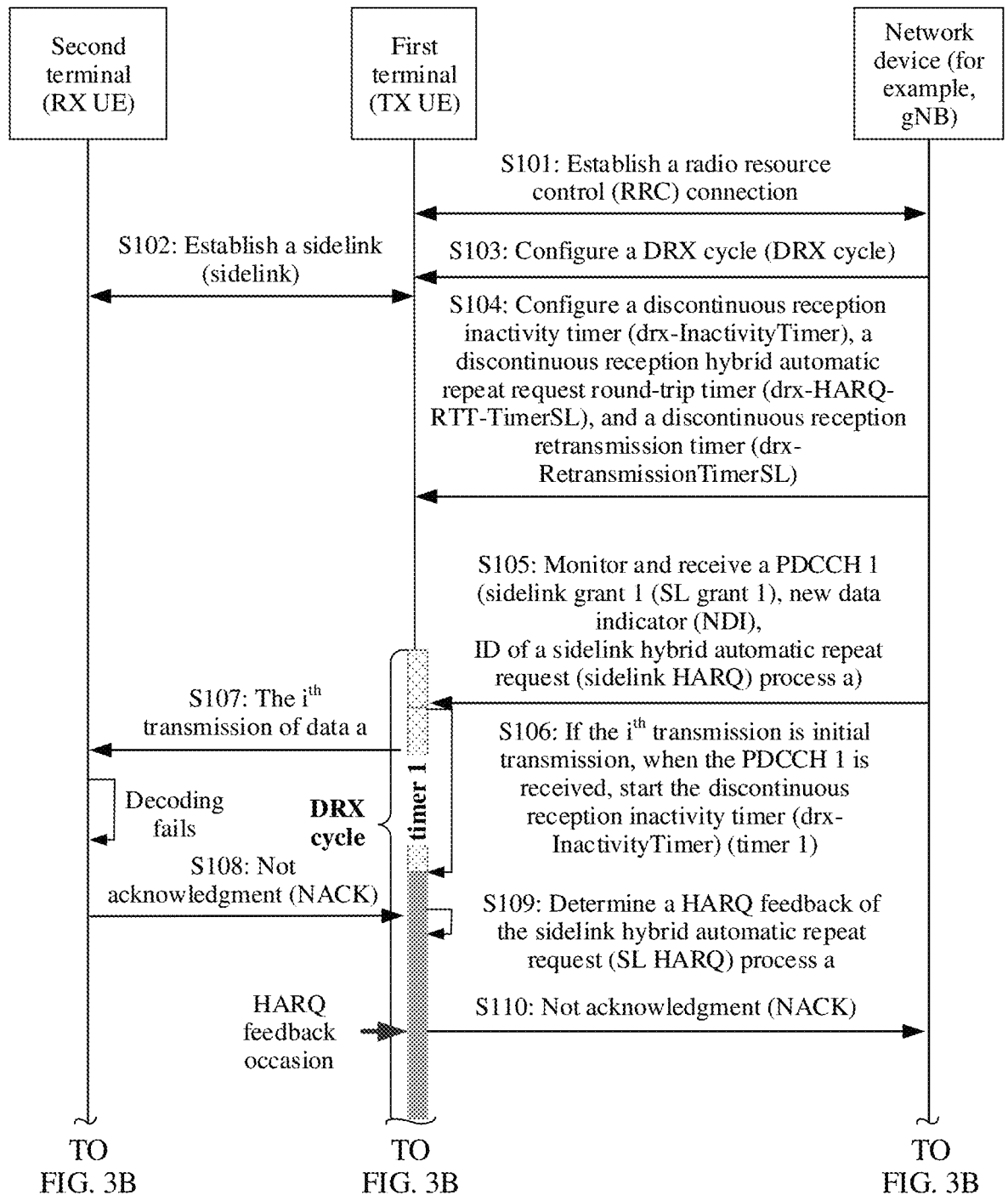
FIG. 3A and FIG. 3B are a schematic flowchart of a discontinuous reception method according to an embodiment of this application.
Figure 3B:
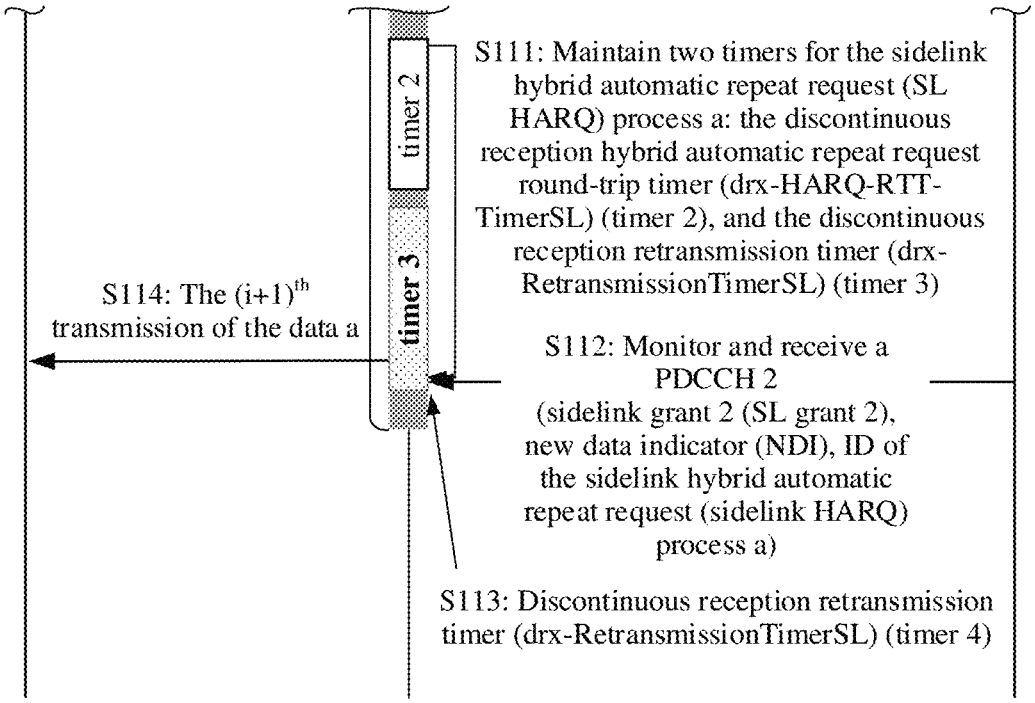

FIG. 3A and FIG. 3B show a specific procedure of a discontinuous reception method according to Embodiment 1. Details are as follows.

Phase 1. Before the $i^{th}$ transmission of a sidelink HARQ process a (S101 to S104)

S101: Establish an RRC connection between the first terminal and a network device.

After the RRC connection is established, the first terminal enters an RRC connected mode.

S102: Establish a sidelink between the first terminal and a second terminal.

After the sidelink is established, the first terminal transmits data to the second terminal through the sidelink.

S103: The network device configures a DRX cycle for the first terminal in the RRC connected mode.

The DRX cycle consists of "On Duration" and "Opportunity for DRX". Within the "On Duration", the first terminal monitors and receives the PDCCH (an active mode). Within the "Opportunity for DRX", the first terminal does not receive downlink channel data to reduce power consumption (a sleep mode).

S104: The network device configures timers for the first terminal in the RRC connected mode: a drx-InactivityTimer, a drx-HARQ-RTT-TimerSL, and a drx-RetransmissionTimerSL. In this embodiment, the drx-HARQ-RTT-TimerSL may be referred to as a first timer, and the drx-RetransmissionTimerSL may be referred to as a second timer. How to maintain the timers will be described later. Details are not described herein.

In phase 1, a sequence is not limited to that shown in FIG. 3A, and S102 may be performed before S101. A time sequence of S102 and S101, S103, S104 is not limited in this application.

In phase 1, the first terminal may further send a resource scheduling request to the network device, to request the network device to schedule a transmission resource for sidelink data transmission. Usually, the resource scheduling request may carry a buffer status report (Buffer Status Report), to indicate an amount of sidelink data to be sent by the first terminal on the sidelink. Correspondingly, after receiving the resource scheduling request, the network device may schedule a resource for sidelink transmission, and deliver the scheduled resource in the PDCCH. The first terminal may obtain, by monitoring the PDCCH, the resource scheduled by the network device.

Phase 2. The $i^{th}$ transmission of the sidelink HARQ process a (S105 to S108)

S105: The first terminal may monitor and receive a PDCCH 1 delivered by the network device. The PDCCH 1 may indicate a resource scheduled by the network device for the $i^{th}$ transmission of a specific sidelink HARQ process (for example, the sidelink HARQ process a), that is, the PDCCH 1 may be used to schedule the $i^{th}$ transmission of the sidelink HARQ process a.

The sidelink HARQ process a may be associated with data a. The sidelink HARQ process a may be used by the first terminal to transmit the data a to the second terminal on the sidelink established in S102. The sidelink HARQ process a may maintain two state variables: a CURRENT_SL_TX_NB and an SL_HARQ_FEEDBACK. The CURRENT_SL_TX_NB may indicate a quantity of transmission times of the data a, and the CURRENT_SL_TX_NB may be initialized to 0. The SL_HARQ_FEEDBACK may indicate a HARQ feedback of the data a.

The PDCCH 1 may carry the following information: an SL grant 1, an NDI, and an ID of the sidelink HARQ process a. The SL grant 1 may indicate a resource scheduled by the network device for the $i^{th}$ transmission of the sidelink HARQ process a. The NDI may indicate whether the $i^{th}$ transmission of the sidelink HARQ process a scheduled by the PDCCH 1 is initial transmission (initial transmission) or retransmission (retransmission).

S106: If the $i^{th}$ transmission of the sidelink HARQ process a is the initial transmission, the first terminal may start the timer: drx-InactivityTimer (that is, a timer 1 in FIG. 3A) when monitoring and receiving the PDCCH 1. During running of the drx-InactivityTimer, the first terminal is in the active mode, and monitors the PDCCH. In this way, the "On Duration" of the DRX cycle may be extended, to prolong a time in which the first terminal is in the active mode.

Specifically, the first terminal may determine whether the $i^{th}$ transmission of the sidelink HARQ process a is the initial transmission or the retransmission based on whether the NDI in the PDCCH 1 is toggled (toggled). If a value of the NDI in the PDCCH 1 is toggled compared with an NDI in a PDCCH previously scheduled for the sidelink HARQ process a, it indicates that the $i^{th}$ transmission of the sidelink HARQ process a is the initial transmission; otherwise, it indicates that the $i^{th}$ transmission of the sidelink HARQ process a is the retransmission. An NDI toggle may mean that a value of an NDI changes from 0 to 1, or from 1 to 0.

S107: After receiving the PDCCH 1, the first terminal may transmit the data a to the second terminal by using the sidelink HARQ process a on the resource indicated by the PDCCH 1, that is, perform the $i^{th}$ transmission of the data a. Correspondingly, the second terminal may receive, on the resource indicated by the PDCCH 1, the data a sent by the first terminal.

Specifically, the second terminal may obtain, by monitoring a PSCCH, a resource on which the first terminal transmits the data a. The reason is that after receiving the PDCCH 1, the first terminal may send sidelink control information (sidelink control information, SCI) on the PSCCH. The second terminal may receive the SCI by monitoring the PSCCH. The SCI is used to indicate the resource on which the first terminal transmits the data a.

S108: The first terminal may send the HARQ feedback to the second terminal. The HARQ feedback is used to indicate whether the second terminal successfully receives the data a. If the HARQ feedback is ACK, it indicates that the second terminal successfully receives the data a. If the HARQ feedback is NACK, it indicates that the second terminal fails to receive the data a.

The failure of the second terminal to successfully receive the data a may include but is not limited to the following cases: The second terminal fails to decode the data a; and the second terminal fails to receive, on the resource indicated by the PDCCH 1, the data a sent by the first terminal.

Phase 3. Maintaining the two timers associated with the sidelink HARQ process a (S109 to S111)

S109: The first terminal determines a HARQ feedback of the sidelink HARQ process a. The HARQ feedback of the sidelink HARQ process a is used to indicate whether receiving for the $i^{th}$ transmission of the data a succeeds. How to determine whether receiving for the $i^{th}$ transmission of the data a succeeds is described later.

S110: The first terminal may send the HARQ feedback of the sidelink HARQ process a to the network device on a HARQ feedback occasion of the sidelink HARQ process a. Correspondingly, the network device may receive, on the HARQ feedback occasion, the HARQ feedback of the sidelink HARQ process a sent by the first terminal.

If the HARQ feedback is NACK, the network device may schedule a resource for a retransmission of the sidelink HARQ process a (that is, the $(i+1)^{th}$ transmission of the data a). In a possible case, the state variable CURRENT_SL_TX_NB associated with the sidelink HARQ process a indicates that a quantity of transmission times of the sidelink HARQ process a exceeds a maximum. In this possible case, the network device may no longer schedule a resource for the retransmission of the sidelink HARQ process a. In this case, TX UE may disable the sidelink HARQ process a, or associate the sidelink HARQ process a with new sidelink data, such as data b.

In a possible case, on the HARQ feedback occasion of the sidelink HARQ process a, the first terminal transmits other data instead of the HARQ feedback of the sidelink HARQ process a. For example, the first terminal may transmit uplink data to the network device on the HARQ feedback occasion. For another example, the first terminal may transmit sidelink data to the second terminal or another terminal on the HARQ feedback occasion.

S111: In the first time unit after the HARQ feedback occasion of the sidelink HARQ process a, the first terminal may maintain two timers: the drx-HARQ-RTT-TimerSL (that is, a timer 2 in FIG. 3B) and the drx-Retransmission-TimerSL (that is, a timer 3 in FIG. 3B). Both timers are associated with the sidelink HARQ process a. A time unit may be a symbol, a slot, or the like. A unit of timing of the two timers may be a symbol, a slot, or an absolute time unit (for example, milliseconds).

Specifically, the first terminal may first start the drx-HARQ-RTT-TimerSL. When the drx-HARQ-RTT-TimerSL expires, the first terminal may start the drx-Retransmission-TimerSL. The first terminal monitors the PDCCH during running of the drx-RetransmissionTimerSL.

How to maintain the drx-HARQ-RTT-TimerSL and the drx-RetransmissionTimerSL is described later. Details are not described herein.

Phase 4. The $(i+1)^{th}$ transmission of the sidelink HARQ process a (S112 to S114)

S112: The first terminal may receive a PDCCH 2. A resource indicated by the PDCCH 2 may be a resource scheduled by the network device for the $(i+1)^{th}$ transmission of the sidelink HARQ process a, that is, the PDCCH 2 may be used to schedule the $(i+1)^{th}$ transmission of the sidelink HARQ process a.

The PDCCH 2 may carry the following information: an SL grant 2, an NDI, and an ID of the sidelink HARQ process a. The SL grant 2 is the resource scheduled by the network device for the $(i+1)^{th}$ transmission of the sidelink HARQ process a. The NDI may indicate whether the $(i+1)^{th}$ transmission of the sidelink HARQ process a scheduled by the PDCCH 1 is initial transmission (initial transmission) or retransmission (retransmission).

Compared with the $i^{th}$ transmission, the $(i+1)^{th}$ transmission is the retransmission, and the $i^{th}$ transmission is previous transmission of the $(i+1)^{th}$ transmission.

S113. When monitoring and receiving the PDCCH 2, the first terminal may stop the drx-RetransmissionTimerSL.

In a possible case, the resource indicated by the PDCCH 2 may be a resource scheduled by the network device for initial transmission of the sidelink HARQ process a. In this case, the sidelink HARQ process a associates with new data, for example, the data b. That is, the sidelink HARQ process a is already used by the first terminal to transmit the new data instead of the data a. Usually, this possible case may occur when the quantity of transmission times of the data a reaches the maximum (for example, five times). In this case, the first terminal may also stop the drx-RetransmissionTimerSL.

S114: After receiving the PDCCH 2, the first terminal may transmit the data a to the second terminal by using the sidelink HARQ process a on the resource indicated by the PDCCH 2, that is, perform the $(i+1)^{th}$ transmission of the data a. Correspondingly, the second terminal may receive, on the resource indicated by the PDCCH 2, the data a sent by the first terminal.

It can be learned that in Embodiment 1, the first terminal may start the drx-HARQ-RTT-TimerSL in the first time unit after the HARQ feedback occasion of the sidelink HARQ process a, and when the drx-HARQ-RTT-TimerSL expires, start the drx-RetransmissionTimerSL. In other words, after the HARQ feedback occasion, during running of the drx-RetransmissionTimerSL, the first terminal is in the active mode, and may monitor and receive a PDCCH that is delivered by the network device during the running and that is used to schedule the retransmission of the sidelink HARQ process a. In this way, efficiency of the retransmission of the sidelink HARQ process a can be improved, and an increase of delay of sidelink data retransmission is avoided.

The following content describes how the first terminal determines the HARQ feedback of the sidelink HARQ process a in S109.

(1) In any one of the following cases, the first terminal may determine that the HARQ feedback of the sidelink HARQ process a is NACK, that is, determine that receiving for previous transmission of the sidelink HARQ process a fails.

Case 1: The HARQ feedback that is received by the first terminal and sent by the second terminal is NACK.

The HARQ feedback is used to indicate whether receiving by the second terminal for the previous transmission of data associated with the sidelink HARQ process a succeeds. The HARQ feedback being NACK may indicate that the second terminal fails to receive the data associated with the sidelink HARQ process a. A reason why the second terminal fails to receive the data associated with the sidelink HARQ process a may include but is not limited to: The second terminal fails to decode the data. Herein, a first resource is the resource scheduled by the network device for the previous transmission of the sidelink HARQ process a.

Case 2: The first terminal fails to receive the HARQ feedback sent by the second terminal.

In case 2, S108 in FIG. 3A does not exist. The failure of the first terminal to receive the HARQ feedback sent by the second terminal may specifically mean that the first terminal fails to receive, on the feedback occasion of the sidelink HARQ process a, the HARQ feedback sent by the second terminal. The feedback occasion of the sidelink HARQ process a may be configured by the network device.

Case 3: The first terminal fails to transmit the sidelink data to the second terminal on the first resource.

In case 3, S107 in FIG. 3A does not exist, and correspondingly, S108 does not exist. Herein, the first resource is the resource scheduled by the network device for the previous transmission of the sidelink HARQ process a. A cause of Case 3 may be a resource conflict. To be specific, the first terminal transmits other data on the first resource instead of the data a.

(2) In the following cases, the first terminal may determine that the HARQ feedback of the sidelink HARQ process a is ACK, that is, determine that receiving for the previous transmission of the sidelink HARQ process a succeeds.

The HARQ feedback that is received by the first terminal and sent by the second terminal is ACK. The HARQ feedback being ACK may indicate that the second terminal successfully receives the data associated with the sidelink HARQ process a.

The following describes several implementations in which the first terminal maintains two timers: the drx-HARQ-RTT-TimerSL and the drx-RetransmissionTimerSL.

Manner 1

In the first time unit after the HARQ feedback occasion of the sidelink HARQ process a, the first terminal may start the drx-HARQ-RTT-TimerSL. If the HARQ feedback of the sidelink HARQ process a is NACK, the first terminal may start the drx-RetransmissionTimerSL when the drx-HARQ-RTT-TimerSL expires. The first terminal monitors the PDCCH during the running of the drx-RetransmissionTimerSL.

Manner 2

If the HARQ feedback of the sidelink HARQ process a is NACK, the first terminal may start the drx-HARQ-RTT-TimerSL in the first time unit after the HARQ feedback occasion of the sidelink HARQ process a. When the drx-HARQ-RTT-TimerSL expires, the first terminal may start the drx-RetransmissionTimerSL. The first terminal monitors the PDCCH during the running of the drx-RetransmissionTimerSL.

The initial transmission and the retransmission of the data a are used as examples. The following describes manner 1 and manner 2 with reference to FIG. 4A, FIG. 4B, FIG. 5A and FIG. 5B.

Figure 4A:
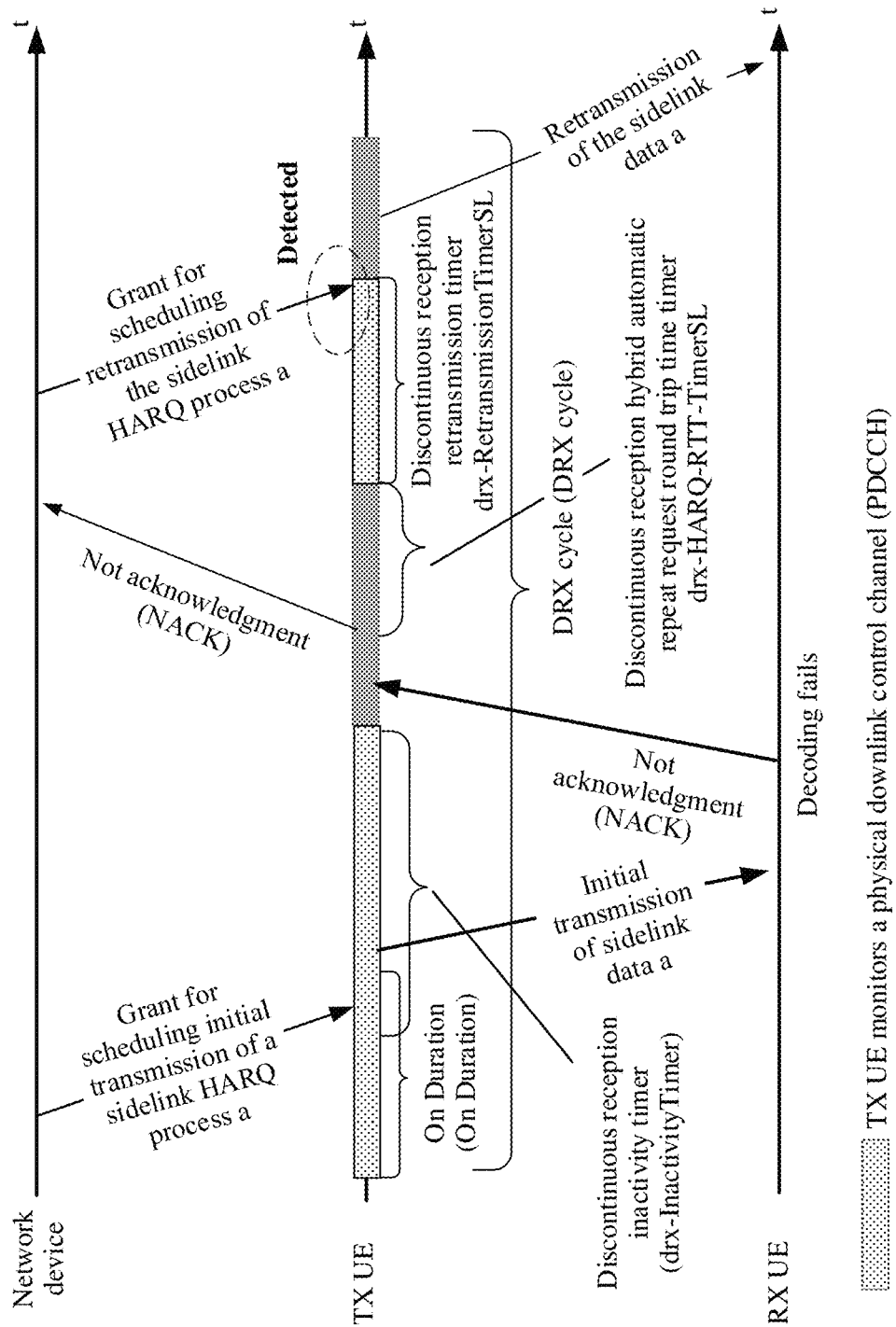
FIG. 4A and FIG. 4B are schematic diagrams of timer maintenance processes according to the embodiment of FIG. 3A and FIG. 3B.
Figure 4B:
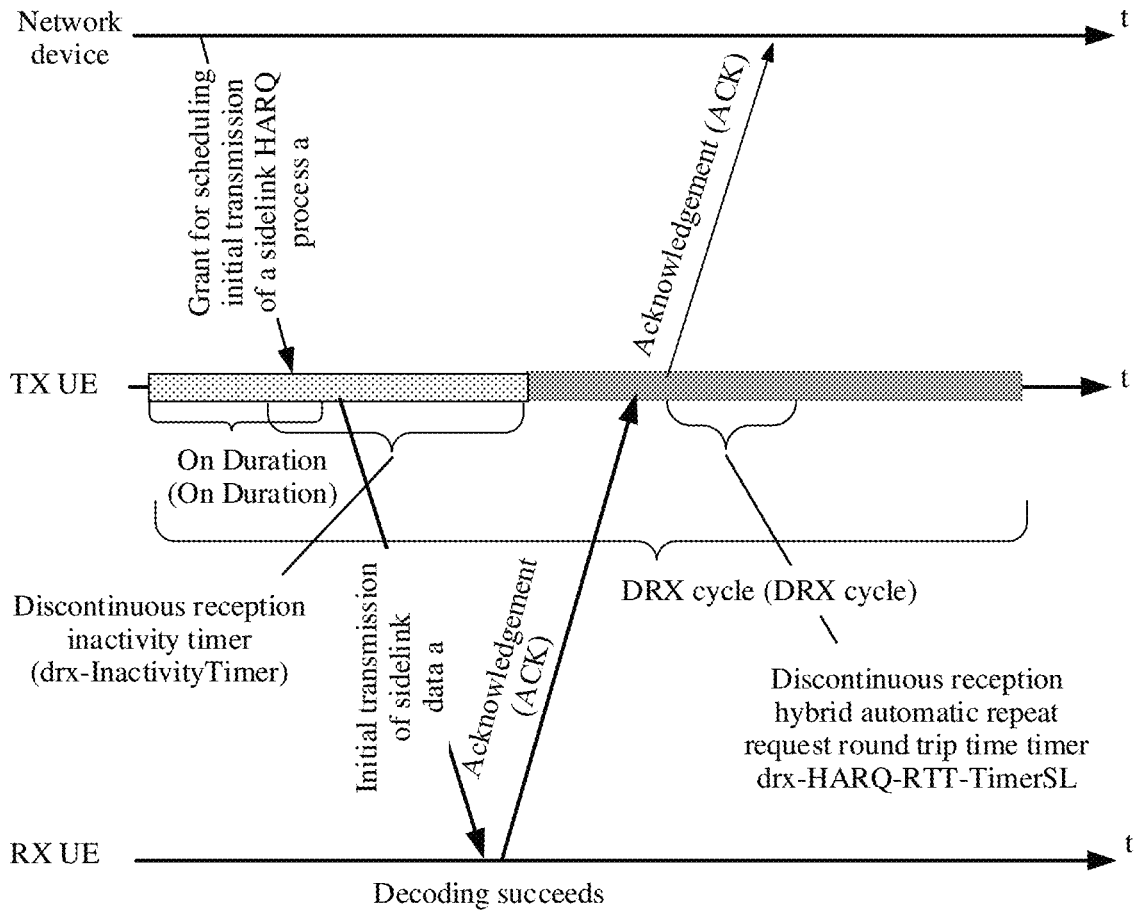
Figure 5A:
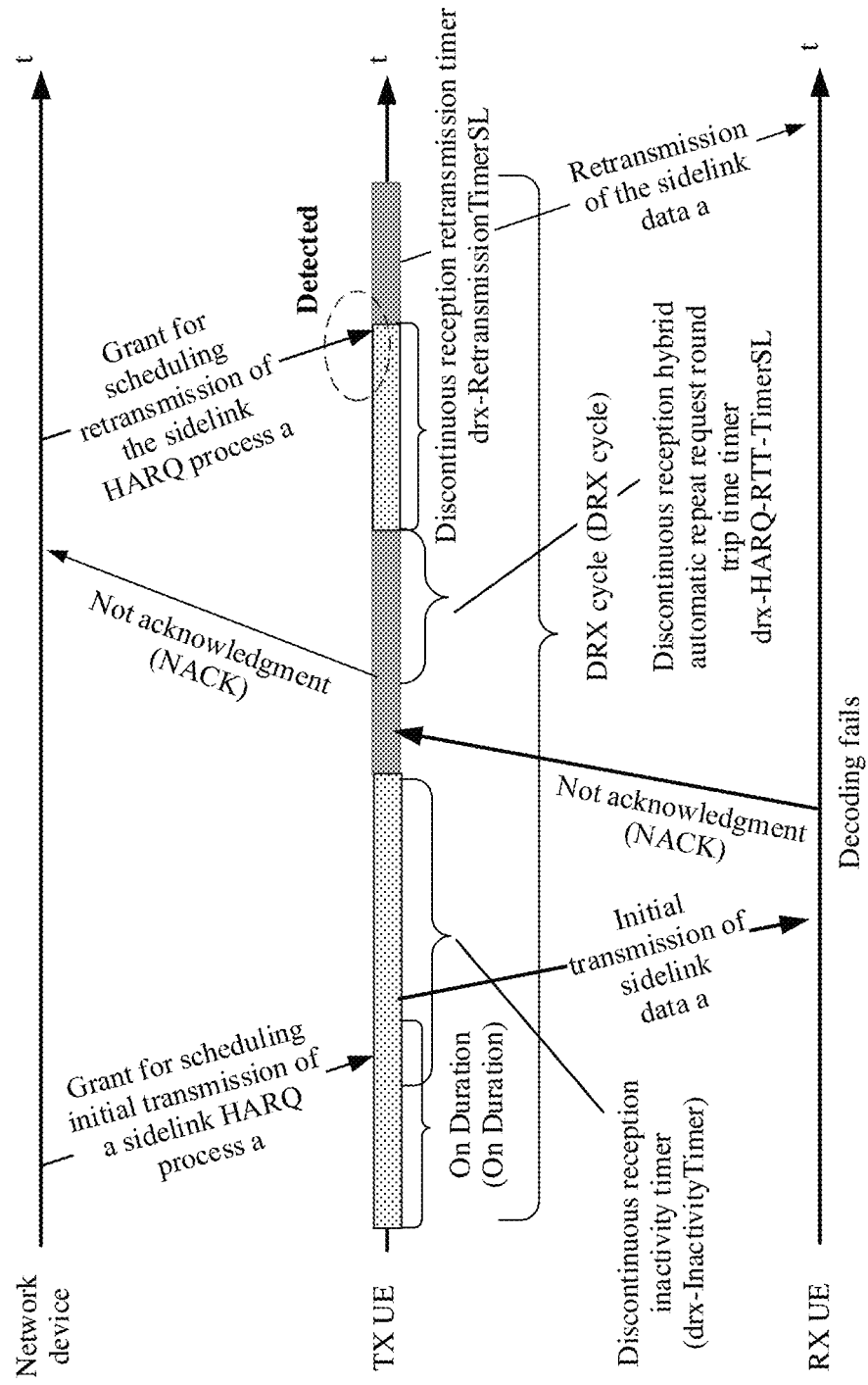
FIG. 5A and FIG. 5B are schematic diagrams of other timer maintenance processes according to the embodiment of FIG. 3A and FIG. 3B.
Figure 5B:
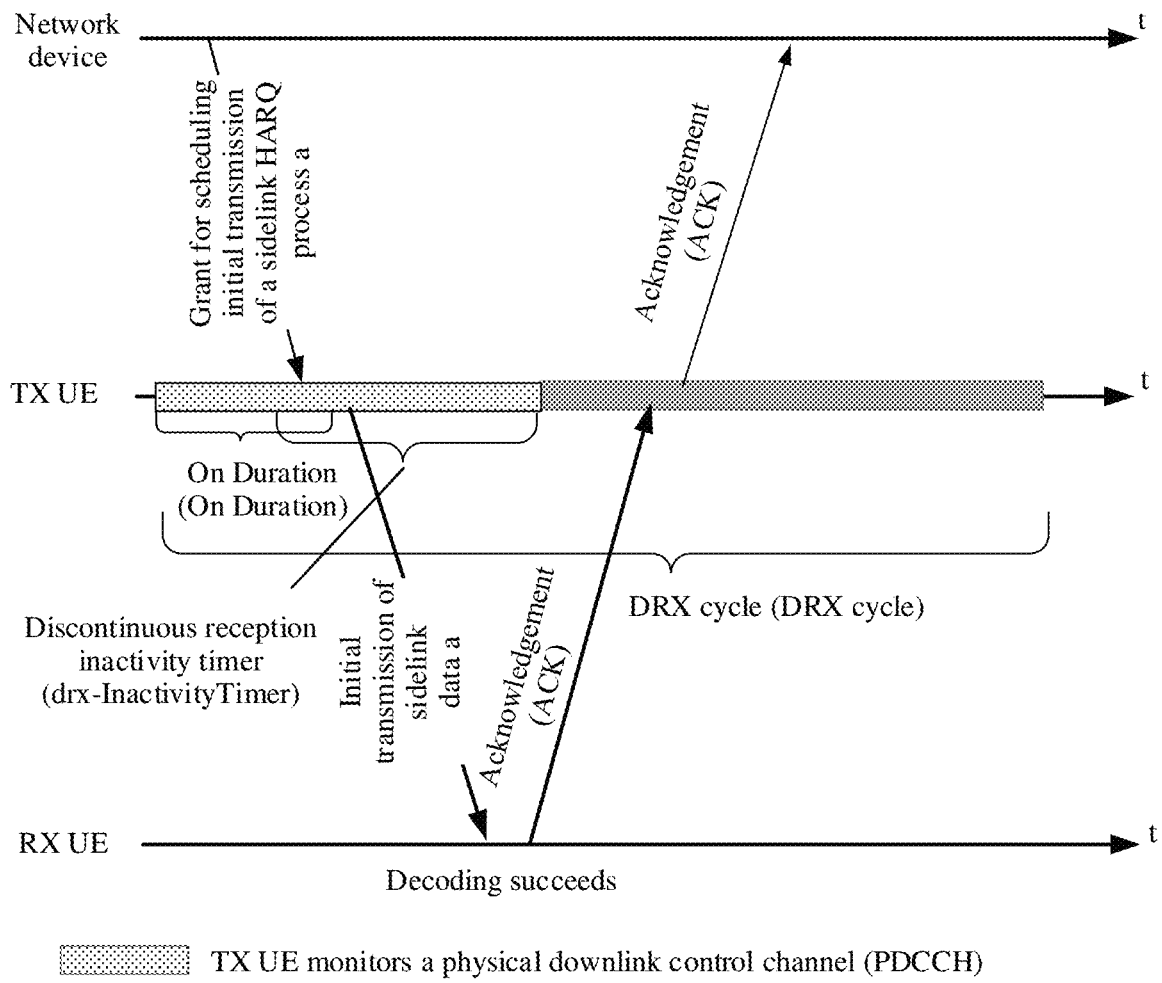

FIG. 4A and FIG. 4B show examples of a timer maintenance process in Manner 1. FIG. 5A and FIG. 5B show examples of a timer maintenance process in Manner 2. FIG. 4A and FIG. 5A show examples in which receiving for initial transmission of the sidelink HARQ process a fails. FIG. 4B and FIG. 5B show examples in which receiving for the initial transmission of the sidelink HARQ process a succeeds.

The first terminal (TX UE) may monitor the PDCCH within the "On Duration" of the DRX cycle, and receive a grant for initial transmission (grant for initial transmission) used to schedule the initial transmission of the sidelink HARQ process a. When receiving the grant for scheduling the initial transmission, the TX UE may start the timer: drx-InactivityTimer. During the running of the drx-InactivityTimer, the TX UE monitors the PDCCH.

As shown in FIG. 4A and FIG. 4B, regardless of whether receiving for the initial transmission of the sidelink HARQ process a succeeds, the TX UE may start the drx-HARQ-RTT-TimerSL in the first time unit (for example, the first symbol) after the HARQ feedback occasion of the sidelink HARQ process a. If receiving for the initial transmission of the sidelink HARQ process a fails, for example, the RX UE fails in decoding, the TX UE may start the drx-RetransmissionTimerSL when the HARQ-RTT-TimerSL expires. If receiving for the initial transmission of the sidelink HARQ process a succeeds, the TX UE does not start the drx-RetransmissionTimerSL when the HARQ-RTT-TimerSL expires.

As shown in FIG. 5A and FIG. 5B, if receiving for the initial transmission of the sidelink HARQ process a fails, for example, the RX UE fails in decoding, the TX UE may start the drx-HARQ-RTT-TimerSL in the first time unit (for example, the first symbol) after the HARQ feedback occasion of the sidelink HARQ process a, and the TX UE starts the drx-RetransmissionTimerSL when the HARQ-RTT-TimerSL expires. If receiving for the initial transmission of the sidelink HARQ process a succeeds, the TX UE starts neither the drx-HARQ-RTT-TimerSL nor the drx-RetransmissionTimerSL.

In addition to the HARQ feedback of the sidelink HARQ process a, the state variable SL_HARQ_FEEDBACK associated with the sidelink HARQ process a may also be used to indicate whether receiving for the previous transmission of the sidelink HARQ process a succeeds.

The maintenance manner is not limited to the foregoing Manner 1 and Manner 2. The first terminal may also maintain the drx-HARQ-RTT-TimerSL and the drx-RetransmissionTimerSL based on the state variable SL_HARQ_FEEDBACK associated with the sidelink HARQ process a. A specific implementation may be as follows. If the state variable SL_HARQ_FEEDBACK associated with the sidelink HARQ process a is NACK, the first terminal may start the drx-HARQ-RTT-TimerSL in the first time unit after the HARQ feedback occasion of the sidelink HARQ process a. If the state variable SL_HARQ_FEEDBACK associated with the sidelink HARQ process a is NACK, the first terminal may start the drx-RetransmissionTimerSL when the drx-HARQ-RTT-TimerSL expires.

Embodiment 2

In this embodiment, for each sidelink HARQ process configured as a sidelink HARQ retransmission mechanism that is based on a HARQ feedback, a first terminal maintains one timer for each sidelink HARQ process. During running of the timer, the first terminal monitors a PDCCH. The timer may be referred to as a third timer.

Figure 6A:
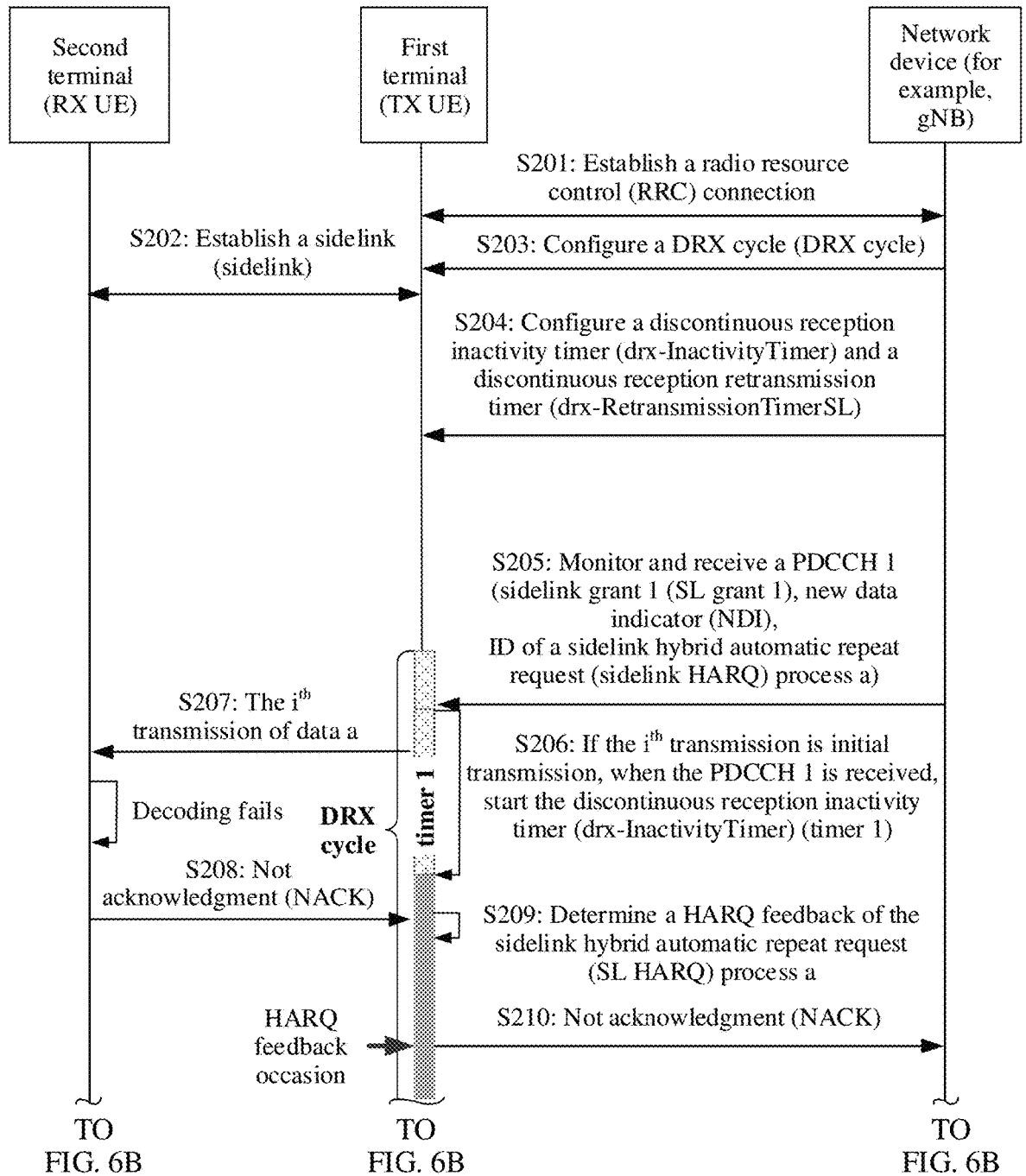
FIG. 6A and FIG. 6B are a schematic flowchart of a discontinuous reception method according to another embodiment of this application.
Figure 6B:
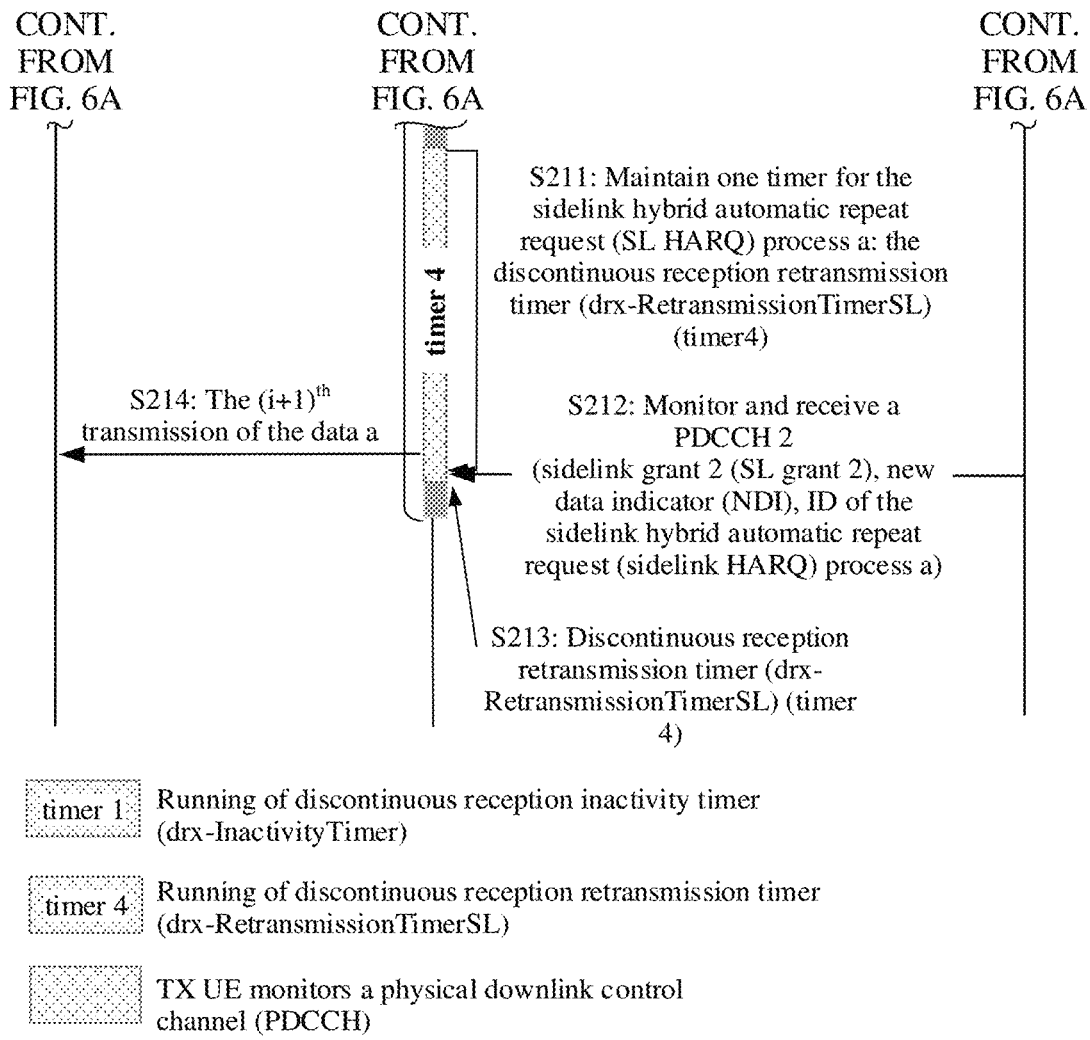

FIG. 6A and FIG. 6B show a specific procedure of a discontinuous reception method according to Embodiment 2. Details are as follows.

Phase 1. Before the $i^{th}$ transmission of a sidelink HARQ process a (S201 to S204)

S201: Establish an RRC connection between the first terminal and a network device.

S202: Establish a sidelink between the first terminal and a second terminal.

S203: The network device configures a DRX cycle for the first terminal in an RRC connected mode.

S204: The network device configures timers for the first terminal in the RRC connected mode: a drx-InactivityTimer and a drx-RetransmissionTimerSL. In this embodiment, the drx-RetransmissionTimerSL may be referred to as a third timer. How to maintain the timers will be described later. Details are not described herein.

For details of phase 1 in Embodiment 2, refer to descriptions about phase 1 in Embodiment 1. Details are not described herein again.

Phase 2. The $i^{th}$ transmission of the sidelink HARQ process a (S205 to S208)

S205: The first terminal may monitor and receive a PDCCH 1 delivered by the network device. The PDCCH 1 may indicate a resource scheduled by the network device for the $i^{th}$ transmission of a specific sidelink HARQ process (for example, the sidelink HARQ process a), that is, the PDCCH 1 may be used to schedule the $i^{th}$ transmission of the sidelink HARQ process a.

The sidelink HARQ process a may be associated with data a. The sidelink HARQ process a may be used by the first terminal to transmit the data a to the second terminal on the sidelink established in S202. The sidelink HARQ process a may maintain two state variables: a CURRENT_SL_TX_NB and an SL_HARQ_FEEDBACK. The CURRENT_SL_TX_NB may indicate a quantity of transmission times of the data a, and the CURRENT_SL_TX_NB may be initialized to 0. The SL_HARQ_FEEDBACK may indicate a HARQ feedback of the data a.

The PDCCH 1 may carry the following information: an SL grant 1, an NDI, and an ID of the sidelink HARQ process a. The SL grant 1 may indicate a resource scheduled by the network device for the $i^{th}$ transmission of the sidelink HARQ process a. The NDI may indicate whether the $i^{th}$ transmission of the sidelink HARQ process a scheduled by the PDCCH 1 is initial transmission (initial transmission) or retransmission (retransmission).

S206: If the $i^{th}$ transmission of the sidelink HARQ process a is the initial transmission, the first terminal may start the timer: drx-InactivityTimer (that is, a timer 1 in FIG. 6A) when monitoring and receiving the PDCCH 1. During running of the drx-InactivityTimer, the first terminal is in the active mode, and monitors the PDCCH. In this way, "On Duration" of the DRX cycle may be extended, to prolong a time in which the first terminal is in the active mode.

S207: After receiving the PDCCH 1, the first terminal may transmit the data a to the second terminal by using the sidelink HARQ process a on the resource indicated by the PDCCH 1, that is, perform the $i^{th}$ transmission of the data a. Correspondingly, the second terminal may receive, on the resource indicated by the PDCCH 1, the data a sent by the first terminal.

S208: The first terminal may send the HARQ feedback to the second terminal. The HARQ feedback is used to indicate whether the second terminal successfully receives the data a. If the HARQ feedback is ACK, it indicates that the second terminal successfully receives the data a. If the HARQ feedback is NACK, it indicates that the second terminal fails to receive the data a.

For details of phase 2 in Embodiment 2, refer to descriptions about phase 2 in Embodiment 1. Details are not described herein again.

Phase 3. Maintaining the third timer associated with the sidelink HARQ process a (S209 to S211)

S209: The first terminal determines a HARQ feedback of the sidelink HARQ process a. The HARQ feedback of the sidelink HARQ process a is used to indicate whether receiving for the $i^{th}$ transmission of the data a succeeds. For how to determine the HARQ feedback of the sidelink HARQ process a, refer to related content in Embodiment 1. Details are not described herein.

S210: The first terminal may send the HARQ feedback of the sidelink HARQ process a to the network device on a HARQ feedback occasion of the sidelink HARQ process a. Correspondingly, the network device may receive, on the HARQ feedback occasion, the HARQ feedback of the sidelink HARQ process a sent by the first terminal.

S211: In the first time unit after the HARQ feedback occasion of the sidelink HARQ process a, the first terminal may maintain the third timer: the drx-RetransmissionTimerSL (that is, a timer 4 in FIG. 6B). The third timer is associated with the sidelink HARQ process a. A time unit may be a symbol or a slot. A unit of timing of the third timer may be a symbol, a slot, or an absolute time unit (for example, milliseconds).

Specifically, if it is determined that the HARQ feedback of the sidelink HARQ process a is NACK, the first terminal may start the drx-RetransmissionTimerSL in the first time unit after the HARQ feedback occasion of the sidelink HARQ process a. The first terminal monitors the PDCCH during the running of the drx-RetransmissionTimerSL.

For details of phase 3 in Embodiment 2, refer to descriptions about phase 3 in Embodiment 1. Details are not described herein again.

Phase 4. The $(i+1)^{th}$ transmission of the sidelink HARQ process a (S212 to S214)

S212: The first terminal may receive a PDCCH 2. A resource indicated by the PDCCH 2 may be a resource scheduled by the network device for the $(i+1)^{th}$ transmission of the sidelink HARQ process a, that is, the PDCCH 2 may be used to schedule the $(i+1)^{th}$ transmission of the sidelink HARQ process a.

S213: When monitoring and receiving the PDCCH 2, the first terminal may stop the drx-RetransmissionTimerSL.

S214: After receiving the PDCCH 2, the first terminal may transmit the data a to the second terminal by using the sidelink HARQ process a on the resource indicated by the PDCCH 2, that is, perform the $(i+1)^{th}$ transmission of the data a. Correspondingly, the second terminal may receive, on the resource indicated by the PDCCH 2, the data a sent by the first terminal.

For details of phase 4 in Embodiment 2, refer to descriptions about phase 4 in Embodiment 1. Details are not described herein again.

In Embodiment 2, for how to determine the HARQ feedback of the sidelink HARQ process a, refer to related content in Embodiment 1. Details are not described herein.

In addition to the HARQ feedback of the sidelink HARQ process a, the state variable SL_HARQ_FEEDBACK associated with the sidelink HARQ process a may also be used to indicate whether receiving for the previous transmission of the sidelink HARQ process a succeeds.

In addition to the HARQ feedback of the sidelink HARQ process a as described in the foregoing phase 3, the first terminal may also maintain the drx-RetransmissionTimerSL based on the state variable SL_HARQ_FEEDBACK associated with the sidelink HARQ process a. A specific implementation may be as follows. If the state variable SL_HARQ_FEEDBACK associated with the sidelink HARQ process a is NACK, the first terminal may start the drx-RetransmissionTimerSL in the first time unit after the HARQ feedback occasion of the sidelink HARQ process a.

Figure 7A:
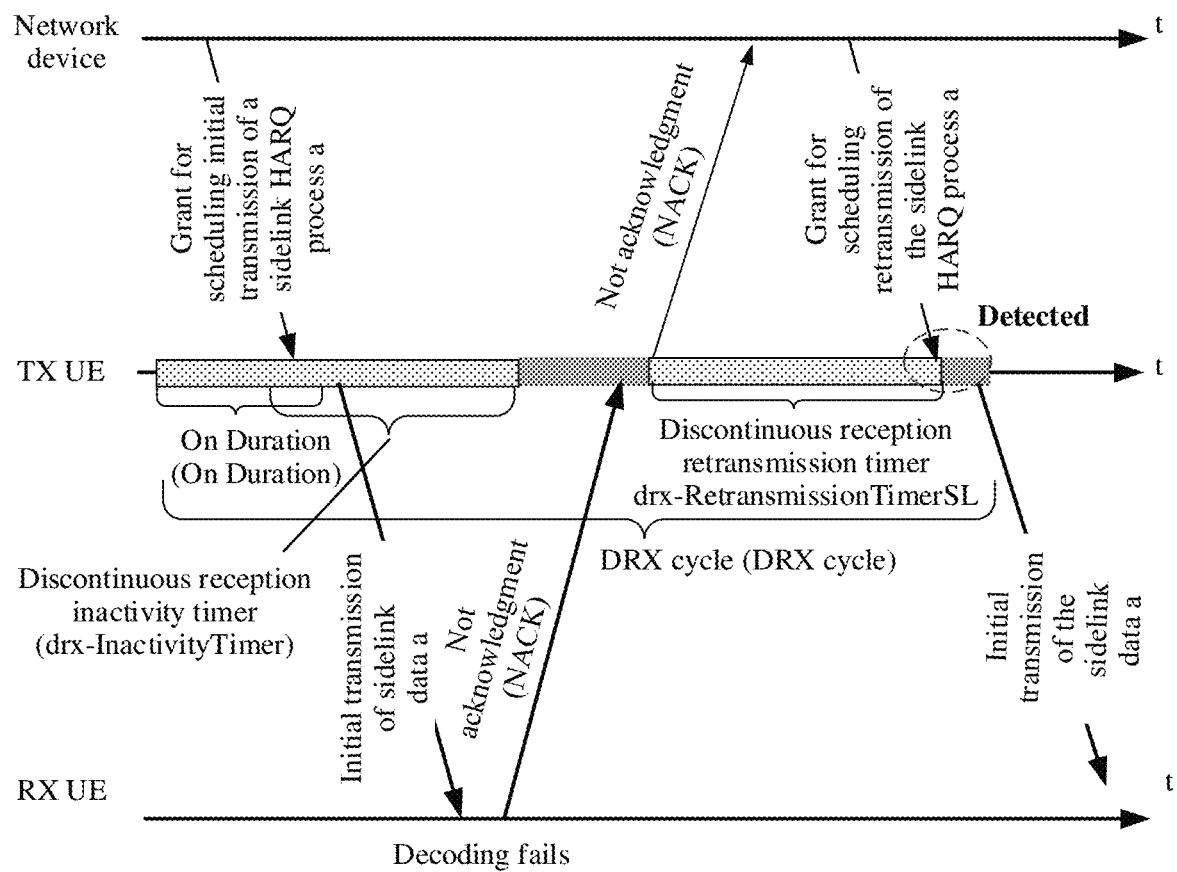
FIG. 7A and FIG. 7B are schematic diagrams of timer maintenance processes according to the embodiment of FIG. 6A and FIG. 6B.
Figure 7B:
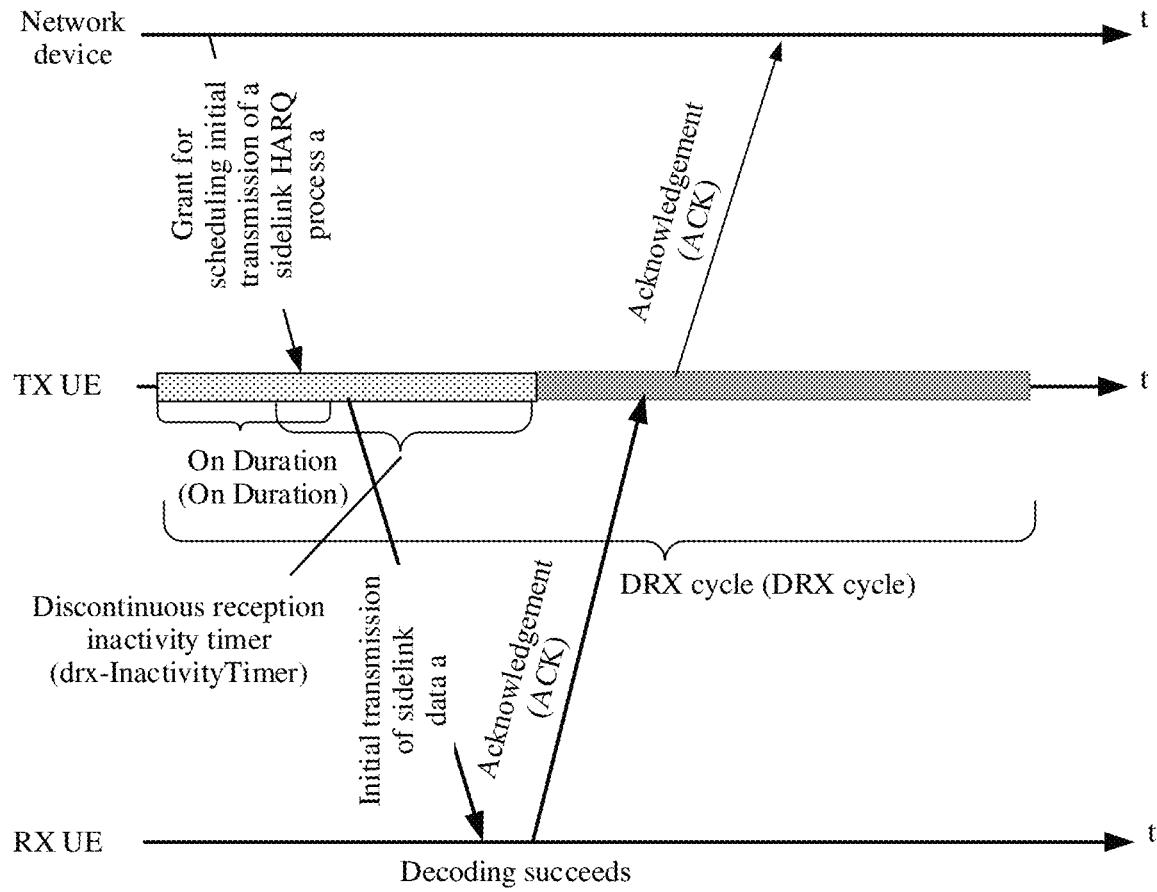

The initial transmission and the retransmission of the data a are used as examples. The following describes a third timer maintenance process with reference to FIG. 7A and FIG. 7B. FIG. 7A shows an example in which receiving for initial transmission of the sidelink HARQ process a fails. FIG. 7B shows an example in which receiving for the initial transmission of the sidelink HARQ process a succeeds.

As shown in FIG. 7A and FIG. 7B, the first terminal (TX UE) may monitor the PDCCH within the "On Duration" of the DRX cycle, and receive a grant for initial transmission (grant for initial transmission) used to schedule the initial transmission of the sidelink HARQ process a. When receiving the grant for scheduling the initial transmission, the TX UE may start the timer: drx-InactivityTimer. During the running of the drx-InactivityTimer, the TX UE monitors the PDCCH.

As shown in FIG. 7A and FIG. 7B, if receiving for the initial transmission of the sidelink HARQ process a fails, for example, the RX UE fails in decoding, the TX UE may start the drx-RetransmissionTimerSL in the first time unit after the HARQ feedback occasion of the sidelink HARQ process a. If receiving for the initial transmission of the sidelink HARQ process a succeeds, the TX UE may not start the drx-RetransmissionTimerSL.

It can be learned that in Embodiment 2, in the first time unit after the HARQ feedback occasion of the sidelink HARQ process a, the first terminal may start the drx-RetransmissionTimerSL. The first terminal monitors the PDCCH during the running of the drx-RetransmissionTimerSL. In other words, after the first time unit of the HARQ feedback occasion, the first terminal is in the active mode, and may detect the PDCCH that is delivered by the network device and that is used to schedule the retransmission of the sidelink HARQ process a. In this way, efficiency of the retransmission of the sidelink HARQ process a can be improved, and an increase of delay of sidelink data retransmission is avoided.

Embodiment 3

For Embodiment 3, refer to Embodiment 2. In embodiment 3, for each sidelink HARQ process configured as a sidelink HARQ retransmission mechanism that is based on a HARQ feedback, a first terminal maintains one timer for each sidelink HARQ process. During running of the timer, the first terminal monitors a PDCCH. A difference from Embodiment 2 is that the timer is a drx-InactivityTimer. That is, if receiving for previous transmission of a Sidelink HARQ process a fails, the drx-InactivityTimer may be started or restarted.

Embodiment 4

Figure 8:
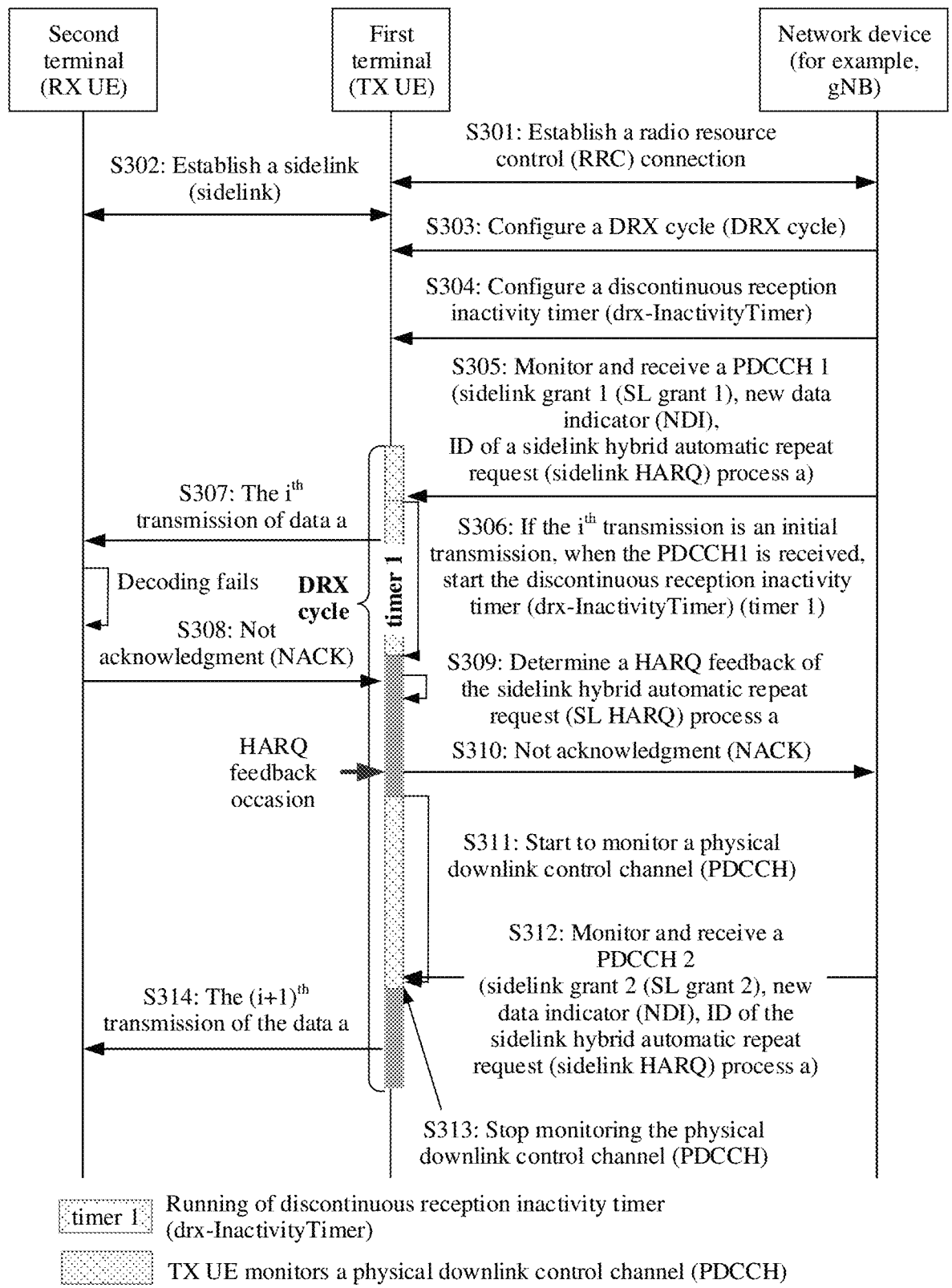
FIG. 8 is a schematic flowchart of a discontinuous reception method according to still another embodiment of this application.

In this embodiment, for each sidelink HARQ process configured as a HARQ retransmission mechanism that is based on a sidelink HARQ feedback, if it is determined that previous transmission of a sidelink HARQ process a fails, a first terminal monitors a PDCCH FIG. 8 shows a specific procedure of a discontinuous reception method according to Embodiment 1. Details are as follows.

Phase 1. Before the $i^{th}$ transmission of a sidelink HARQ process a (S301 to S304)

S301: An RRC connection is established between the first terminal and a network device.

S302: A sidelink is established between the first terminal and a second terminal.

S303: The network device configures a DRX cycle for the first terminal in an RRC connected mode.

S304: The network device configures a timer for the first terminal in the RRC connected mode: a drx-InactivityTimer.

For details of phase 1 in Embodiment 4, refer to descriptions about phase 1 in Embodiment 1. Details are not described herein again.

Phase 2. The $i^{th}$ transmission of the sidelink HARQ process a (S305 to S308)

S305: The first terminal may monitor and receive a PDCCH 1 delivered by the network device. The PDCCH 1 may indicate a resource scheduled by the network device for the $i^{th}$ transmission of a specific sidelink HARQ process (for example, the sidelink HARQ process a), that is, the PDCCH 1 may be used to schedule the $i^{th}$ transmission of the sidelink HARQ process a.

S306: If the $i^{th}$ transmission of the sidelink HARQ process a is the initial transmission, the first terminal may start the timer: drx-InactivityTimer (that is, a timer 1 in FIG. 8) when monitoring and receiving the PDCCH 1. During running of the drx-InactivityTimer, the first terminal is in an active mode, and monitors the PDCCH. In this way, "On Duration" of the DRX cycle may be extended, to prolong a time in which the first terminal is in the active mode.

S307: After receiving the PDCCH 1, the first terminal may transmit the data a to the second terminal by using the sidelink HARQ process a on the resource indicated by the PDCCH 1, that is, perform the $i^{th}$ transmission of the data a. Correspondingly, the second terminal may receive, on the resource indicated by the PDCCH 1, the data a sent by the first terminal.

S308: The first terminal may send the HARQ feedback to the second terminal. The HARQ feedback is used to indicate whether the second terminal successfully receives the data a. If the HARQ feedback is ACK, it indicates that the second terminal successfully receives the data a. If the HARQ feedback is NACK, it indicates that the second terminal fails to receive the data a.

For details of phase 2 in Embodiment 4, refer to descriptions about phase 2 in Embodiment 1. Details are not described herein again.

Phase 3: Monitoring the PDCCH based on a HARQ feedback of the sidelink HARQ process a (S309 to S311)

S309: The first terminal determines the HARQ feedback of the sidelink HARQ process a. The HARQ feedback of the sidelink HARQ process a is used to indicate whether receiving for the $i^{th}$ transmission of the data a succeeds.

S310: The first terminal may send the HARQ feedback of the sidelink HARQ process a to the network device on a HARQ feedback occasion of the sidelink HARQ process a. Correspondingly, the network device may receive, on the HARQ feedback occasion, the HARQ feedback of the sidelink HARQ process a sent by the first terminal.

S311: If the HARQ feedback of the sidelink HARQ process a is NACK, the first terminal may start to monitor the PDCCH in the first time unit after the HARQ feedback occasion of the sidelink HARQ process a. A time unit may be a symbol, a slot, or an absolute time unit (for example, milliseconds).

For details of phase 3 not described in Embodiment 4, refer to related content in Embodiment 1. Details are not described herein again.

Phase 4. The $(i+1)^{th}$ transmission of the sidelink HARQ process a (S312 to S314)

S312: The first terminal may receive a PDCCH 2. A resource indicated by the PDCCH 2 may be a resource scheduled by the network device for the $(i+1)^{th}$ transmission of the sidelink HARQ process a, that is, the PDCCH 2 may be used to schedule the $(i+1)^{th}$ transmission of the sidelink HARQ process a.

S313: When the PDCCH 2 is monitored and received, and none of the following conditions is met, the first terminal may stop monitoring the PDCCH.

Condition 1: One or more of the following timers are running: drx-onDurationTimer; drx-InactivityTimer; drx-RetransmissionTimerDL; drx-RetransmissionTimerUL; and ra-ContentionResolutionTimer.

Condition 2: The first terminal sends a scheduling request on the PUCCH, and the scheduling request is pending.

Condition 3: The first terminal receives a non-contention-based random access response message, but does not receive the PDCCH that is scrambled by a C-RNTI and that indicates a new transmission.

S314: After receiving the PDCCH 2, the first terminal may transmit the data a to the second terminal by using the sidelink HARQ process a on the resource indicated by the PDCCH 2, that is, perform the $(i+1)^{th}$ transmission of the data a. Correspondingly, the second terminal may receive, on the resource indicated by the PDCCH 2, the data a sent by the first terminal.

For details of phase 4 not described in Embodiment 4, refer to related content in Embodiment 1. Details are not described herein again.

In Embodiment 4, for how to determine the HARQ feedback of the sidelink HARQ process a, refer to related content in Embodiment 1. Details are not described herein.

In addition to the HARQ feedback of the sidelink HARQ process a, the state variable SL_HARQ_FEEDBACK associated with the sidelink HARQ process a may also be used to indicate whether receiving for the previous transmission of the sidelink HARQ process a succeeds.

In addition to the HARQ feedback of the sidelink HARQ process a as described in the foregoing phase 3, the first terminal may also monitor the PDCCH based on the state variable SL_HARQ_FEEDBACK associated with the sidelink HARQ process a. A specific implementation may be as follows. If the state variable SL_HARQ_FEEDBACK associated with the sidelink HARQ process a is NACK, the first terminal may start to monitor the PDCCH in the first time unit after the HARQ feedback occasion of the sidelink HARQ process a.

In an implementation, the first terminal may monitor the PDCCH, provided that an SL_HARQ_Feedback associated with any sidelink HARQ process maintained by the first terminal is NACK.

If the state variable SL_HARQ_FEEDBACK associated with the sidelink HARQ process a is ACK, and none of the following conditions is met, the first terminal may stop monitoring the PDCCH.

Condition 1: One or more of the following timers are running: drx-onDurationTimer; drx-InactivityTimer; drx-RetransmissionTimerDL; drx-RetransmissionTimerUL; and ra-ContentionResolutionTimer.

Condition 2: The first terminal sends a scheduling request on a PUCCH, and the scheduling request is pending.

Condition 3: The first terminal receives a non-contention-based random access response message, but does not receive the PDCCH that is scrambled by a C-RNTI and that indicates a new transmission.

In a possible case, the state variable SL_HARQ_FEEDBACK associated with the sidelink HARQ process a is NACK, however, a state variable CURRENT_SL_TX_NB associated with the sidelink HARQ process a indicates that a quantity of transmission times of the data a reaches a maximum. In this case, when none of the following conditions is met, the first terminal may stop monitoring the PDCCH.

Condition 1: One or more of the following timers are running: drx-onDurationTimer; drx-InactivityTimer; drx-RetransmissionTimerDL; drx-RetransmissionTimerUL; and ra-ContentionResolutionTimer.

Condition 2: The first terminal sends a scheduling request on a PUCCH, and the scheduling request is pending.

Condition 3: The first terminal receives a non-contention-based random access response message, but does not receive the PDCCH that is scrambled by a C-RNTI and that indicates a new transmission.

Figure 9:
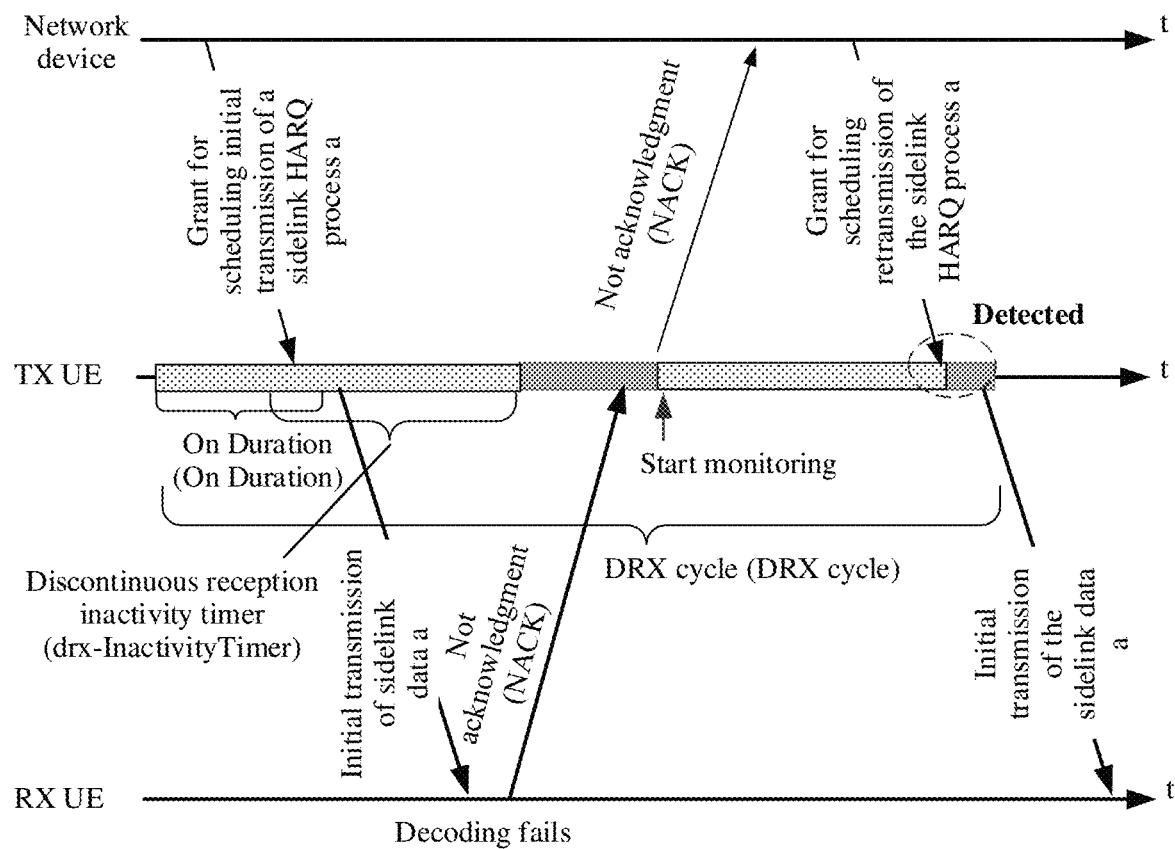
FIG. 9 is a schematic diagram of a PDCCH monitoring process according to the embodiment of FIG. 8.

Initial transmission and retransmission of the data a are used as examples. With reference to FIG. 9, the following describes how TX UE starts to monitor the PDCCH. FIG. 9 shows an example in which receiving for initial transmission of the sidelink HARQ process a fails.

As shown in FIG. 9, the first terminal (TX UE) may monitor the PDCCH within the "On Duration" of the DRX cycle, and receive a grant for initial transmission (grant for initial transmission) used to schedule the initial transmission of the sidelink HARQ process a. When receiving the grant for scheduling the initial transmission, the TX UE may start the timer: drx-InactivityTimer. During the running of the drx-InactivityTimer, the TX UE monitors the PDCCH.

As shown in FIG. 9, if receiving for the initial transmission of the sidelink HARQ process a fails, for example, the RX UE fails in decoding, the TX UE may start to monitor the PDCCH in the first time unit after the HARQ feedback occasion of the sidelink HARQ process a.

In can be learned that, in Embodiment 4, if receiving for the previous transmission of the sidelink HARQ process a fails, the first terminal may start to monitor the PDCCH in the first time unit after the HARQ feedback occasion of the sidelink HARQ process a. To be specific, if receiving for the previous transmission of the sidelink HARQ process a fails, after the HARQ feedback occasion, the first terminal is in the active mode, and may monitor and receive the PDCCH that is delivered by the network device and that is used to schedule a retransmission of the sidelink HARQ process a. In this way, efficiency of the retransmission of the sidelink HARQ process a can be improved, and an increase of delay of sidelink data retransmission is avoided.

The following describes several aspects (1) to (3) related to the foregoing Embodiment 1 to Embodiment 4.

(1) The State Variable SL_HARQ_FEEDBACK Associated with the Sidelink HARQ Process a In the foregoing Embodiment 1 to Embodiment 4, an initial value of the state variable SL_HARQ_FEEDBACK associated with the sidelink HARQ process a may be set to ACK. The SL_HARQ_FEEDBACK being ACK may indicate that receiving for the previous transmission of the sidelink HARQ process a succeeds. The SL_HARQ_FEEDBACK being NACK may indicate that receiving for the previous transmission of the sidelink HARQ process a fails.

The following describes how the first terminal maintains the state variable SL_HARQ_FEEDBACK associated with the sidelink HARQ process a.

1. The first terminal may set the SL_HARQ_FEEDBACK to ACK in any one of the following cases.

Case 1: The HARQ feedback that is received by the first terminal and sent by the second terminal is ACK.

Case 2: The first terminal monitors and receives the PDCCH used to schedule transmission (including initial transmission and retransmission) of the sidelink HARQ process a.

2. The first terminal may set the SL_HARQ_FEEDBACK to NACK in any one of the following cases.

Case 1: The HARQ feedback that is received by the first terminal and sent by the second terminal is NACK.

Case 2: The first terminal fails to receive the HARQ feedback sent by the second terminal.

The failure of the first terminal to receive the HARQ feedback sent by the second terminal may specifically mean that the first terminal fails to receive, on the feedback occasion of the HARQ feedback, the HARQ feedback sent by the second terminal.

Case 3: The first terminal fails to transmit, to the second terminal, the data a associated with the sidelink HARQ process a on the transmission resource allocated to the sidelink HARQ process a.

Herein, the transmission resource allocated to the sidelink HARQ process a may be used for the initial transmission or the retransmission of the sidelink HARQ process a. A cause of Case 3 may be a resource conflict. To be specific, the first terminal transmits other data on the transmission resource allocated to the sidelink HARQ process a instead of the data a.

(2) The State Variable CURRENT_SL_TX_NB Associated with the Sidelink HARQ Process a In the foregoing Embodiment 1 to Embodiment 4, an initial value of the state variable CURRENT_SL_TX_NB associated with the sidelink HARQ process a may be set to 0. Each time the first terminal monitors and receives the PDCCH used to schedule the transmission (including the initial transmission and the retransmission) of the sidelink HARQ process a, the first terminal may increase the CURRENT_SL_TX_NB associated with the sidelink HARQ process a by 1. The PDCCH used to schedule the transmission of the sidelink HARQ process a may indicate the transmission resource allocated by the network device to the sidelink HARQ process a.

(3) Lengths of the Symbol and the Slot

In the foregoing Embodiment 1 to Embodiment 4, the lengths of the symbol and the slot may depend on a parameter set Numerology of a bandwidth part BWP of a sidelink used to transmit first data, for example, subcarrier space (subcarrier space, SCS). This is not limited thereto. The lengths of the symbol and the slot may also depend on a parameter set Numerology, for example, SCS, of a bandwidth part BWP of an uplink through which the HARQ feedback is sent by the first terminal to the network device.

In the foregoing Embodiment 1 to Embodiment 4, in Embodiment 2, the sidelink HARQ process a may be referred to as a first sidelink HARQ process, and the data a may be referred to as first data. The PDCCH 2 may be referred to as a first PDCCH, and the PDCCH 1 may be referred to as a second PDCCH. The HARQ feedback sent by the second terminal to the first terminal may be referred to as a first feedback.

Figure 10:
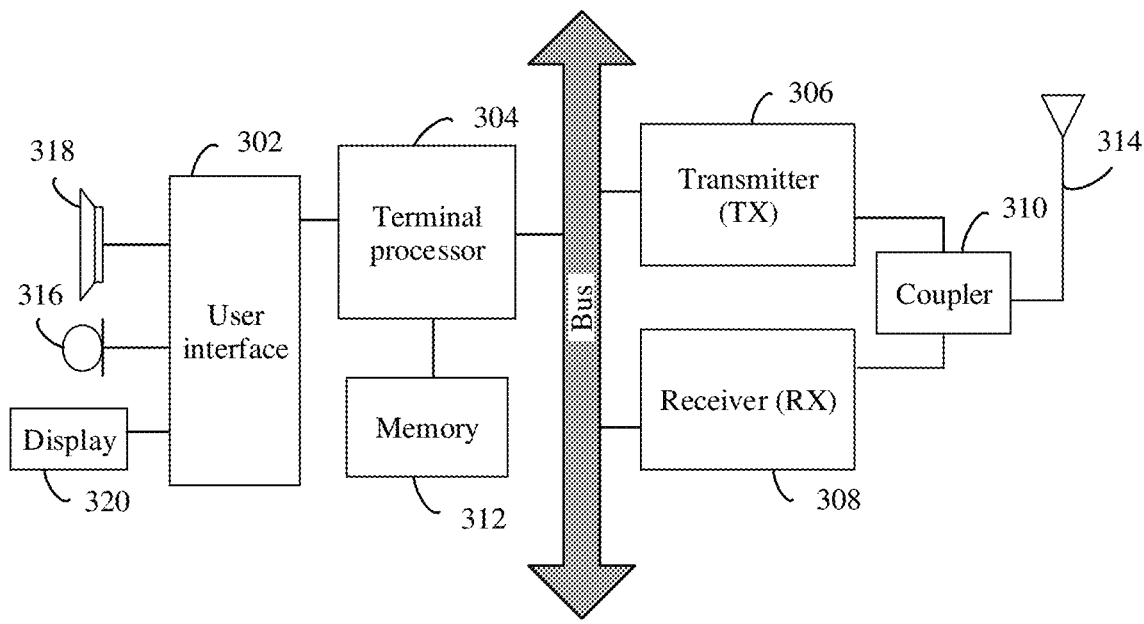
FIG. 10 is a schematic diagram of a hardware architecture of a terminal according to an embodiment of this application.

Refer to FIG. 10. FIG. 10 shows a terminal 300 according to some embodiments of this application. The terminal 300 may be implemented as the first terminal mentioned in the foregoing method embodiments, or may be implemented as the second terminal mentioned in the foregoing method embodiments. Specifically, the terminal 300 may be the terminal 103 (for example, an in-vehicle terminal) in the wireless communications system 100 shown in FIG. 1. As shown in FIG. 10, the terminal 300 may include an input/output module (including an audio input/output module 318, a key input module 316, a display 320, and the like), a user interface 302, one or more terminal processors 304, a transmitter 306, a receiver 308, a coupler 310, an antenna 314, and a memory 312. These components may be connected through a bus or in another manner. In FIG. 10, an example in which the components are connected through the bus is used.

The antenna 314 may be configured to convert electromagnetic energy in a transmission line into an electromagnetic wave in free space, or convert an electromagnetic wave in free space into electromagnetic energy in a transmission line. The coupler 310 is configured to divide a mobile communications signal received by the antenna 314 into a plurality of channels of signals, and allocate the plurality of channels of signals to a plurality of receivers 308.

The transmitter 306 may be configured to perform transmitting processing, for example, signal modulation, on a signal output by the terminal processor 304. The receiver 308 may be configured to perform receiving processing, for example, signal demodulation, on a mobile communications signal received by the antenna 314. In some embodiments of this application, the transmitter 306 and the receiver 308 may be considered as a wireless modem. In the terminal 300, there may be one or more transmitters 306 and receivers 308.

Communications functions of the transmitter 306 and the receiver 308 are applicable to one or more of the following communications systems: global system for mobile communications (Global System for Mobile Communications, GSM) (2G), wideband code division multiple access (Wideband Code Division Multiple Access, WCDMA) (3G), long term evolution (Long Term Evolution, LTE) (4G), 5G, or new radio in the future.

In addition to the transmitter 306 and the receiver 308 shown in FIG. 10, the terminal 300 may further include another communications component, for example, a GPS module, a Bluetooth (Bluetooth) module, or a wireless fidelity (Wireless Fidelity, Wi-Fi) module. In addition to the foregoing wireless communications signal, the terminal 300 may further support another wireless communications signal, for example, a satellite signal or a short-wave signal. In addition to wireless communication, the terminal 300 may be further equipped with a wired network interface (for example, a LAN interface) to support wired communication.

The input/output modules may be configured to implement interaction between the terminal 300 and a user/an external environment, and may mainly include the audio input/output module 318, the key input module 316, the display 320, and the like. In a specific implementation, the input/output modules may further include a camera, a touchscreen, a sensor, and the like. The input/output modules all communicate with the terminal processor 304 through the user interface 302.

The memory 312 is coupled to the terminal processor 304, and is configured to store various software programs and/or a plurality of groups of instructions. In a specific implementation, the memory 312 may include a high-speed random access memory, and may also include a non-volatile memory, for example, one or more magnetic disk storage devices, a flash memory device, or another non-volatile solid-state storage device. The memory 312 may store an operating system (referred to as a system for short below), for example, an embedded operating system such as Android, iOS, Windows, or Linux. The memory 312 may further store a network communications program. The network communications program may be used to communicate with one or more additional devices, one or more terminal devices, and one or more network devices. The memory 312 may further store a user interface program. The user interface program may use a graphical operation interface to vividly display content of an application program, and use input controls such as menus, dialog boxes, and keys to receive control operations of a user on the application program.

In some embodiments of this application, when the terminal 300 is implemented as the first terminal mentioned in the foregoing method embodiments, the memory 312 may be configured to store a program for implementing the discontinuous reception method provided in one or more embodiments of this application on a first terminal side. When the terminal 300 is implemented as the second terminal mentioned in the foregoing method embodiments, the memory 312 may be configured to store a program for implementing the discontinuous reception method provided in one or more embodiments of this application on a second terminal side. For implementation of the discontinuous reception method according to one or more embodiments of this application, refer to subsequent embodiments.

The terminal processor 304 may be configured to read and execute computer-readable instructions. Specifically, the terminal processor 304 may be configured to: invoke a program stored in the memory 312, for example, a program for implementation of the discontinuous reception method provided in one or more embodiments of this application, and execute instructions included in the program.

The terminal processor 304 may be a modem (Modem) processor, and is a module for implementing main functions in wireless communications standards such as 3GPP and ETSI. The modem may be used as an independent chip, or may be combined with other chips or circuits to form a system-specific chip or an integrated circuit. These chips or integrated circuits may be applied to all devices that implement wireless communications functions, including an in-vehicle terminal, a mobile phone, a computer, a notebook, a tablet, a router, a wearable device, and a home appliance. It should be noted that, in different implementations, a processor of the terminal processor 304 may be used as an independent chip and coupled to an off-chip memory, that is, the chip does not include a memory. Alternatively, the processor of the terminal processor 304 is coupled to an on-chip memory and integrated into a chip, that is, the chip includes a memory.

It may be understood that the terminal 300 may be implemented as the terminal 103 in the wireless communications system 100 shown in FIG. 1.

It should be noted that the terminal 300 shown in FIG. 10 is merely an implementation of this application. In actual application, the terminal 300 may include more or fewer components. This is not limited herein.

Figure 11:
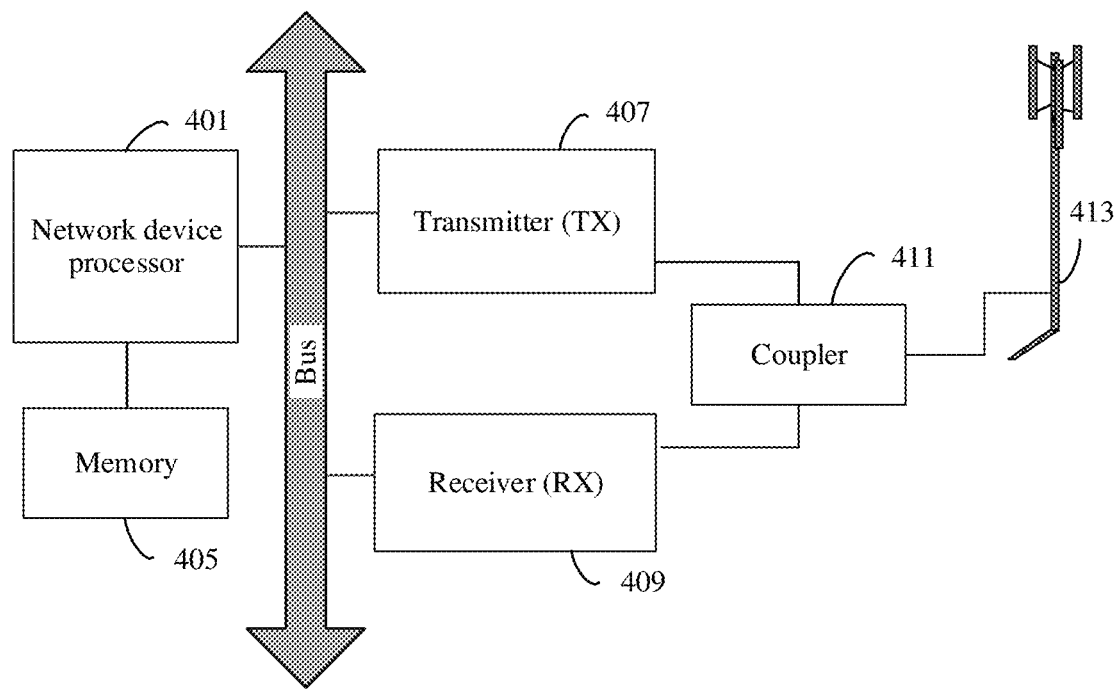
FIG. 11 is a schematic diagram of a hardware architecture of a network device according to an embodiment of this application.

Refer to FIG. 11. FIG. 11 shows a network device 400 according to some embodiments of this application. As shown in FIG. 11, the network device 400 may include one or more network device processors 401, a transmitter 407, a receiver 409, a coupler 411, an antenna 413, and a memory 405. These components may be connected through a bus or in another manner. In FIG. 11, an example in which the components are connected through the bus is used.

The antenna 413 may be configured to convert electromagnetic energy in a transmission line into an electromagnetic wave in free space, or convert an electromagnetic wave in free space into electromagnetic energy in a transmission line. The coupler 411 may be configured to divide a mobile communications signal into a plurality of channels of signals, and allocate the plurality of channels of signals to a plurality of receivers 409.

The transmitter 407 may be configured to perform transmitting processing, for example, signal modulation, on a signal output by the network device processor 401. The receiver 409 may be configured to perform receiving processing, for example, signal demodulation, on a mobile communications signal received by the antenna 413. In some embodiments of this application, the transmitter 407 and the receiver 409 may be considered as a wireless modem. In the network device 400, there may be one or more transmitters 407 and receivers 409.

Communications functions of the transmitter 407 and the receiver 409 are applicable to one or more of the following communications systems: global system for mobile communications (Global System for Mobile Communications, GSM) (2G), wideband code division multiple access (Wideband Code Division Multiple Access, WCDMA) (3G), long term evolution (Long Term Evolution, LTE) (4G), 5G, or new radio in the future.

The memory 405 is coupled to the network device processor 401, and is configured to store various software programs and/or a plurality of groups of instructions. In a specific implementation, the memory 405 may include a high-speed random access memory, and may also include a non-volatile memory, for example, one or more magnetic disk storage devices, a flash memory device, or another non-volatile solid-state storage device. The memory 405 may store an operating system (referred to as a system for short below), for example, an embedded operating system such as uCOS, VxWorks, and RTLinux. The memory 405 may further store a network communications program. The network communications program may be used to communicate with one or more additional devices, one or more terminal devices, and one or more network devices.

The network device processor 401 may be configured to perform radio channel management, establish or release a call or communications link, control handover of user equipment in a current control area, and the like. In a specific implementation, the network device processor 401 may include an administration module/communication module (Administration Module/Communication Module, AM/CM) (a center for speech channel switching and information exchange), a basic module (Basic Module, BM) (configured to implement call processing, signaling processing, radio resource management, radio link management, and circuit maintenance functions), a transcoder and sub-multiplexer (Transcoder and Sub-Multiplexer, TCSM) (configured to implement multiplexing/demultiplexing and transcoding functions), and the like.

In this application, the network device processor 401 may be configured to read and execute computer-readable instructions. Specifically, the network device processor 401 may be configured to invoke a program stored in the memory 405, for example, a program for implementing, on a network device 400 side, the discontinuous reception method according to one or more embodiments of this application, and execute instructions included in the program.

The network device processor 401 may be a modem (Modem) processor, and is a module for implementing main functions in wireless communications standards such as 3GPP and ETSI. The modem may be used as an independent chip, or may be combined with other chips or circuits to form a system-specific chip or an integrated circuit. These chips or integrated circuits may be applied to all network-side devices that implement wireless communications functions, which, for example, are referred to as an evolved NodeB (evolved NodeB, eNB or eNodeB) in an LTE network, a NodeB (NodeB) in the third generation (the 3rd Generation, 3G) network, and a 5G base station (NR NodeB, gNB) in the 5G network. It should be noted that, in different implementations, the network device processor 401 may be used as an independent chip and coupled to an off-chip memory, that is, the chip does not include a memory. Alternatively, a processor of the network device processor 401 is coupled to an on-chip memory and is integrated into a chip, that is, the chip includes a memory.

It may be understood that the network device 400 may be implemented as the network device 101 in the wireless communications system 100 shown in FIG. 1.

It should be noted that the network device 400 shown in FIG. 11 is merely an implementation of this application. In actual application, the network device 400 may alternatively include more or fewer components. This is not limited herein.

Figure 12:
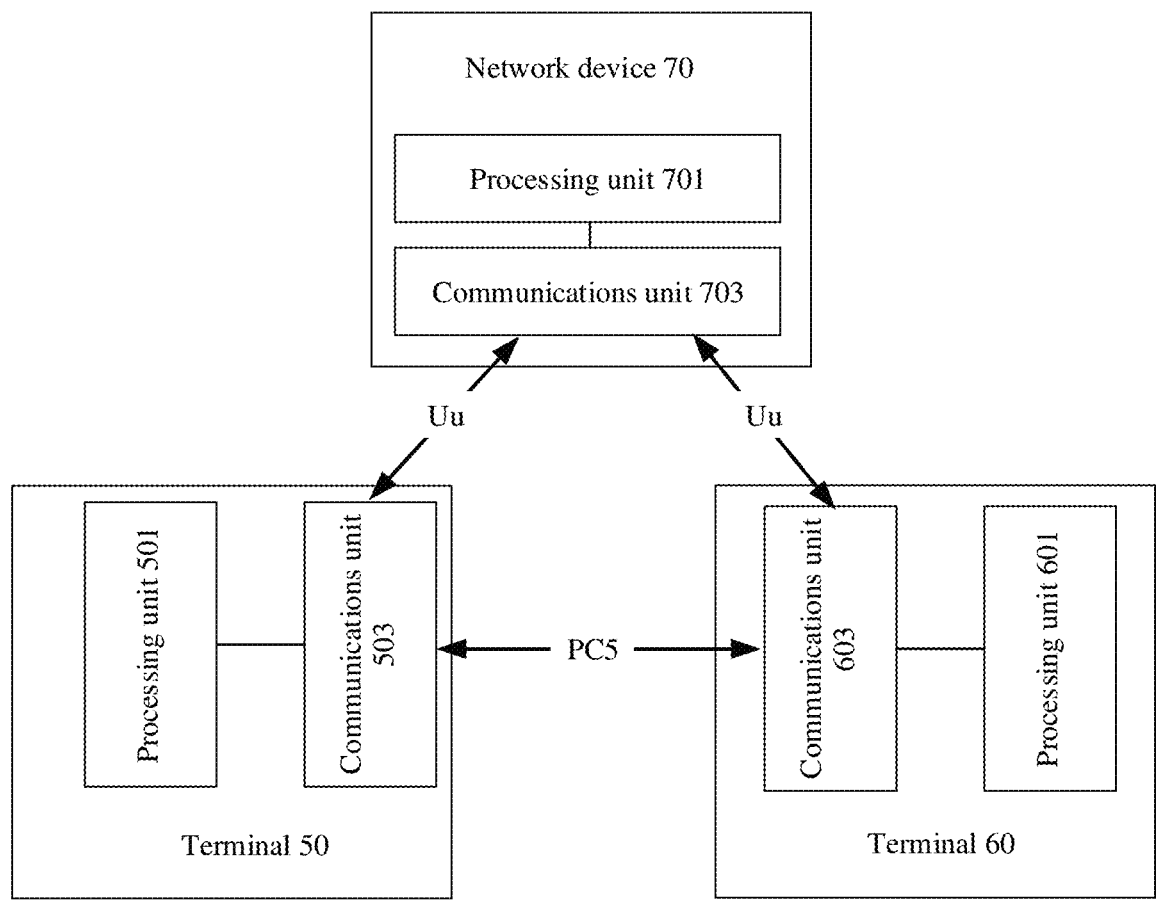
FIG. 12 is a functional block diagram of a wireless communications system and a related apparatus according to this application.

Refer to FIG. 12. FIG. 12 shows a wireless communications system 10 according to an embodiment of this application, and a terminal 500, a terminal 600, and a network device 700 in the wireless communications system 10. The network device 700 may be the network device in the foregoing method embodiments, and the terminal 500 and the terminal 600 may be respectively the first terminal (TX UE) and the second terminal (RX UE) in the foregoing method embodiments. The terminal 500 and the terminal 600 may establish a sidelink connection based on a PC5 interface. An RRC connection may be established between the terminal 500 and the network device 700, and the terminal 500 may be in an RRC connected mode. An RRC connection may also be established between the terminal 600 and the network device 700. Alternatively, the terminal 600 may be located outside a communications coverage area of the network device 700.

As shown in FIG. 12, the terminal 500 may include a processing unit 501 and a communications unit 503.

When the terminal 500 implements the discontinuous reception method described in the foregoing Embodiment 1, implementation of each functional unit may be as follows.

The processing unit 501 may be configured to start a first timer in the first time unit after a HARQ feedback occasion of a first sidelink HARQ process.

The processing unit 501 may be further configured to start a second timer if the first timer expires and a HARQ feedback is NACK. NACK indicates that receiving for previous transmission of the first sidelink HARQ process fails.

The communications unit 503 may be configured to monitor a PDCCH during running of the second timer.

The first timer and the second timer are associated with the first sidelink HARQ process.

The first sidelink HARQ process is associated with first data. The first sidelink HARQ process is used by the terminal 500 to send the first data to the terminal 600. The HARQ feedback occasion is used by the terminal 500 to send the HARQ feedback of the first sidelink HARQ process to the network device. The HARQ feedback is used to indicate whether receiving for the previous transmission of the first sidelink HARQ process succeeds.

The processing unit 501 may be specifically configured to: if the HARQ feedback is NACK, start the first timer in the first time unit after the HARQ feedback occasion of the first sidelink HARQ process.

The following describes several implementations in which the processing unit 501 maintains the first timer and the second timer.

Manner 1

In the first time unit after the HARQ feedback occasion of the first sidelink HARQ process, the processing unit 501 may start the drx-HARQ-RTT-TimerSL. If the HARQ feedback of the first sidelink HARQ process is NACK, the processing unit 501 may start the drx-RetransmissionTimerSL when the drx-HARQ-RTT-TimerSL expires. During running of the drx-RetransmissionTimerSL, the communications unit 503 may monitor the PDCCH.

Manner 2

If the HARQ feedback of the first sidelink HARQ process is NACK, the processing unit 501 may start the first timer in the first time unit after the HARQ feedback occasion of the first sidelink HARQ process. When the drx-HARQ-RTT-TimerSL expires, the processing unit 501 may start the second timer. The communications unit 503 monitors the PDCCH during running of the second timer.

In addition to the HARQ feedback of the first sidelink HARQ process, a state variable SL_HARQ_FEEDBACK associated with the first sidelink HARQ process may also be used to indicate whether receiving for the previous transmission of the first sidelink HARQ process succeeds.

In addition to the foregoing Manner 1 and Manner 2, the processing unit 501 may also maintain the first timer and the second timer based on the state variable SL_HARQ_FEEDBACK associated with the first sidelink HARQ process. A specific implementation may be as follows. If the state variable SL_HARQ_FEEDBACK associated with the first sidelink HARQ process is NACK, the processing unit 501 may start the first timer in the first time unit after the HARQ feedback occasion of the first sidelink HARQ process. If the state variable SL_HARQ_FEEDBACK associated with the first sidelink HARQ process is NACK, when the first timer expires, the processing unit 501 may start the second timer.

When the terminal 500 implements the discontinuous reception method described in the foregoing Embodiment 2, implementation of each functional unit may be as follows.

The processing unit 501 may be configured to start a third timer in the first time unit after a hybrid automatic repeat request HARQ feedback occasion of a first sidelink HARQ process.

A communications unit 502 may be configured to monitor a PDCCH during running of the third timer.

The third timer is associated with the first sidelink HARQ process.

The processing unit 501 may be specifically configured to: if a HARQ feedback is NACK, start the third timer in the first time unit after the HARQ feedback occasion of the first sidelink HARQ process.

In addition to the HARQ feedback of a sidelink HARQ process a, a state variable SL_HARQ_FEEDBACK associated with the sidelink HARQ process a may also be used to indicate whether receiving for previous transmission of the sidelink HARQ process a succeeds.

In addition to the HARQ feedback of the sidelink HARQ process a, the first terminal may also maintain the third timer based on the state variable SL_HARQ_FEEDBACK associated with the sidelink HARQ process a. A specific implementation may be as follows. If the state variable SL_HARQ_FEEDBACK associated with the sidelink HARQ process a is NACK, the first terminal may start the third timer in the first time unit after the HARQ feedback occasion of the sidelink HARQ process a.

When the terminal 500 implements the discontinuous reception method described in the foregoing Embodiment 4, implementation of each functional unit may be as follows.

The processing unit 501 may be configured to determine a HARQ feedback of a first sidelink HARQ process.

The communications unit 503 may be configured to start monitoring a PDCCH in the first time unit after a HARQ feedback occasion of a first sidelink HARQ process, if a HARQ feedback of the first sidelink HARQ process is NACK.

The communications unit 503 may be further configured to stop monitoring the PDCCH when a first PDCCH is detected. The first PDCCH is used to schedule a transmission resource of the first sidelink HARQ process.

The processing unit 501 may be specifically configured to determine that the HARQ feedback of the first sidelink HARQ process is NACK, that is, determine that receiving for previous transmission of the first sidelink HARQ process fails in any one of the following cases:

Case 1: The HARQ feedback that is received by the terminal 500 and sent by the terminal 600 is NACK.

The HARQ feedback is used to indicate whether receiving by the terminal 600 for the previous transmission of data associated with the first sidelink HARQ process succeeds. The HARQ feedback being NACK may indicate that the terminal 600 fails to receive the data associated with the first sidelink HARQ process. A reason why the terminal 600 fails to receive the data associated with the first sidelink HARQ process may include but is not limited to: The terminal 600 fails to decode the data; and the terminal 600 fails to receive the data on a first resource. Herein, the first resource is a resource scheduled by a network device for the previous transmission of the first sidelink HARQ process.

Case 2: The terminal 500 fails to receive the HARQ feedback sent by the terminal 600.

The failure of the terminal 500 to receive the HARQ feedback sent by the terminal 600 may specifically mean that the terminal 500 fails to receive, on the feedback occasion of the first sidelink HARQ process, the HARQ feedback sent by the terminal 600. The feedback occasion of the first sidelink HARQ process may be configured by the network device.

Case 3: The terminal 500 fails to transmit the sidelink data to the terminal 600 on the first resource.

Herein, the first resource is the resource scheduled by the network device for the previous transmission of the first sidelink HARQ process. A cause of Case 3 may be a resource conflict. To be specific, the terminal 500 transmits other data on the first resource instead of the data a.

The processing unit 501 may be specifically configured to determine that the HARQ feedback of the first sidelink HARQ process is ACK, that is, determine that receiving for the previous transmission of the first sidelink HARQ process succeeds in the following case: The HARQ feedback that is received by the terminal 500 and sent by the terminal 600 is ACK. The HARQ feedback being ACK may indicate that the terminal 600 successfully receives the data associated with the first sidelink HARQ process.

As shown in FIG. 12, the network device 700 may include a processing unit 701 and a communications unit 703.

The processing unit 701 may be configured to allocate a resource for transmission (including initial transmission and retransmission) of the first sidelink HARQ process.

The processing unit 701 may be further configured to configure a DRX cycle and timers: drx-InactivityTimer, drx-HARQ-RTT-TimerSL, and drx-RetransmissionTimerSL for the terminal 500 in the RRC connected mode.

The processing unit 701 may be configured to deliver a resource grant on the PDCCH, where the resource grant may be carried in downlink control information DCI. The resource grant may indicate the resource allocated by the network device 700 for the transmission (including the initial transmission and the retransmission) of the first sidelink HARQ process.

As shown in FIG. 12, the terminal 600 may include a processing unit 601 and a communications unit 603.

The communications unit 603 may be configured to receive the first data sent by the terminal 500.

The processing unit 601 may be configured to decode the received first data.

The communications unit 603 may be further configured to send the HARQ feedback to the terminal 500, to indicate whether the terminal 600 successfully receives the first data.

It may be understood that for specific implementations of each functional unit included in the terminal 500, the terminal 600, and the network device 700, refer to the foregoing method embodiments. Details are not described herein again.

In addition, an embodiment of the present invention further provides a wireless communications system. The wireless communications system may be the wireless communications system 100 shown in FIG. 1, or may be the wireless communications system 10 shown in FIG. 12, and may include a first terminal, a second terminal, and a network device. The first terminal may be the first terminal in the foregoing embodiments, the second terminal may be the second terminal in the foregoing embodiments, and the network device may be the network device in the foregoing embodiments. Specifically, the first terminal may be a terminal 300 shown in FIG. 10, the second terminal may be a terminal 300 shown in FIG. 10, and the network device may be a network device 400 shown in FIG. 10.

The following describes specific implementations of the first terminal, the second terminal, and the network device in the wireless communications system by using the foregoing method embodiment 1 as an example.

For example, the terminal shown in FIG. 10 is the first terminal. A terminal processor 304 is configured to invoke instructions stored in a memory 312 to control a transmitter 306 to perform sending and control a receiver 308 to perform receiving. The transmitter 306 is configured to support the terminal in performing a process of transmitting data and/or signaling. The receiver 308 is configured to support the terminal in performing a process of receiving data and/or signaling. The memory 312 is configured to store program code and data of the terminal.

The terminal processor 304 may be configured to start a first timer in the first time unit after a HARQ feedback occasion of a first sidelink HARQ process, if a HARQ feedback is NACK. The terminal processor 304 may be configured to start a second timer if the first timer expires and the HARQ feedback is NACK. NACK indicates that receiving for previous transmission of the first sidelink HARQ process fails.

The receiver 308 may be configured to monitor a PDCCH during running of the second timer.

The first timer and the second timer are associated with the first sidelink HARQ process. The first sidelink HARQ process is associated with first data. The first sidelink HARQ process is used by the terminal 500 to send the first data to the terminal 600. The HARQ feedback occasion is used by the terminal 500 to send the HARQ feedback of the first sidelink HARQ process to the network device. The HARQ feedback is used to indicate whether receiving for the previous transmission of the first sidelink HARQ process succeeds.

In this case, after the HARQ feedback occasion, during the running of the second timer, the first terminal is in an active mode, and may monitor and receive a PDCCH that is delivered by the network device during the running and that is used to schedule a retransmission of the sidelink HARQ process a. In this way, efficiency of the retransmission of the sidelink HARQ process a can be improved, and an increase of delay of sidelink data retransmission is avoided.

For specific implementations of components in the first terminal, refer to the foregoing method embodiments. Details are not described herein again.

For example, the terminal shown in FIG. 10 is the second terminal. The terminal processor 304 is configured to invoke instructions stored in the memory 312 to control the transmitter 306 to perform sending and control the receiver 308 to perform receiving. The transmitter 306 is configured to support the terminal in performing a process of transmitting data and/or signaling. The receiver 308 is configured to support the terminal in performing a process of receiving data and/or signaling. The memory 312 is configured to store program code and data of the terminal.

The receiver 308 may be configured to receive the first data sent by the first terminal.

The terminal processor 304 may be configured to decode the received first data.

The transmitter 306 may be configured to send the HARQ feedback to the first terminal, to indicate whether the first data is successfully received.

For specific implementations of components in the second terminal, refer to the foregoing method embodiments. Details are not described herein again.

For example, the network device shown in FIG. 11 is the foregoing network device. A network device processor 401 is configured to invoke instructions stored in a memory 405 to control a transmitter 407 to perform sending and control a receiver 409 to perform receiving. The transmitter 407 is configured to support the network device in performing a process of transmitting data and/or signaling. The receiver 409 is configured to support the network device in performing a process of receiving data and/or signaling. The memory 405 is configured to store program code and data of a terminal.

The network device processor 401 may be configured to allocate a resource for transmission (including initial transmission and retransmission) of the first sidelink HARQ process. The network device processor 401 may be further configured to configure a DRX cycle and timers: drx-InactivityTimer, drx-HARQ-RTT-TimerSL, and drx-RetransmissionTimerSL for the first terminal in an RRC connected mode.

The transmitter 407 may be configured to deliver a resource grant on the PDCCH, where the resource grant may be carried in downlink control information DCI. The resource grant may indicate the resource allocated by the network device for the transmission (including the initial transmission and the retransmission) of the first sidelink HARQ process.

For specific implementations of components in the network device, refer to the foregoing method embodiments. Details are not described herein again.

In addition, this application further provides an apparatus. The apparatus may include a processor, and a memory coupled to the processor.

The processor may be configured to read and execute computer-readable instructions. In a specific implementation, the processor may mainly include a controller, an arithmetic unit, and a register. The controller is mainly responsible for decoding instructions, and sends a control signal for an operation corresponding to an instruction. The arithmetic unit is mainly responsible for performing a fixed-point or floating-point arithmetic operation, a shift operation, a logic operation, and the like, or may perform address calculation and address conversion. The register is mainly responsible for saving register operands, intermediate operation results, and the like that are temporarily stored during instruction execution. During a specific implementation, a hardware architecture of the processor may be an application-specific integrated circuit (Application Specific Integrated Circuit, ASIC) architecture, an MIPS architecture, an ARM architecture, an NP architecture, or the like. The processor may be a single-core or multi-core processor.

The memory may be configured to store computer-readable instructions. In a specific implementation, the memory may include a high-speed random access memory, a solid-state storage device, or the like. The instructions stored in the memory may be programs for implementing the discontinuous reception method provided in the foregoing method embodiments.

The processor may further be coupled to one or more interfaces. The interface may be a general purpose input/output (General Purpose Input/Output, GPIO) interface, and may be connected to a plurality of peripheral devices (such as a radio frequency module). The interface may further include a plurality of independent interfaces, for example, an Ethernet interface and a mobile communications interface (for example, an X1 interface), which are separately responsible for communication between different peripheral devices and the processor.

The processor may be configured to read and execute the computer-readable instructions stored in the memory. Specifically, the processor may be configured to invoke and execute the instructions stored in the memory, to enable the apparatus to perform the discontinuous reception method provided in the foregoing method embodiments. The interface may be configured to output an execution result of the processor.

The apparatus may be implemented as the first terminal in the foregoing method embodiments, may be implemented as the second terminal in the foregoing method embodiments, or may be implemented as the network device in the foregoing method embodiments. It should be noted that a function of the apparatus may be implemented by hardware, may be implemented by software, or may be implemented by using a combination of software and hardware. This is not limited herein.

In this application, the first terminal may also be referred to as a first apparatus, and the second terminal may also be referred to as a second apparatus.

Methods or algorithm steps described in combination with the content disclosed in the embodiments of the present invention may be implemented by hardware, or may be implemented by a processor executing software instructions. The software instructions may include corresponding software modules. The software modules may be stored in a RAM, a flash memory, a ROM, an erasable programmable ROM (Erasable Programmable ROM, EPROM), an electrically EPROM (Electrically EPROM, EEPROM), a register, a hard disk drive, a removable hard disk drive, a compact disc read-only memory (CD-ROM), or any other form of storage medium well-known in the art. For example, a storage medium is coupled to a processor, so that the processor can read information from the storage medium or write information into the storage medium. Certainly, the storage medium may further be a component of the processor. The processor and the storage medium may be located in an ASIC. In addition, the ASIC may be located in a transceiver or a relay device. Certainly, the processor and the storage medium may exist in a wireless access network device or a terminal device as discrete components.

A person skilled in the art should be aware that in the foregoing one or more examples, functions described in the embodiments of the present invention may be implemented by hardware, software, firmware, or any combination thereof. When software is used to implement the functions, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of the present invention are further described in detail. It should be understood that the foregoing descriptions are merely specific implementations of the embodiments of the present invention, but are not intended to limit the protection scope of the embodiments of the present invention. Any modification, equivalent replacement, or improvement made based on the technical solutions of the embodiments of the present invention shall fall within the protection scope of the embodiments of the present invention.

What is claimed is:

1. A method comprising:
    starting, by a first apparatus, a first timer associated with a first sidelink hybrid automatic repeat request (HARQ) process in a first time unit after a HARQ feedback occasion of the first sidelink HARQ process;
    starting, by the first apparatus, a second timer associated with the first sidelink HARQ process after expiry of the first timer and when a HARQ feedback of the first sidelink HARQ process is negative acknowledgement (NACK), wherein the HARQ feedback being NACK indicates that a first data associated with the first sidelink HARQ process is not successfully decoded by a second apparatus; and
    monitoring, by the first apparatus, a physical downlink control channel (PDCCH) during running of the second timer, wherein
    the first sidelink HARQ process is used by the first apparatus for transmission of the first data to the second apparatus; the HARQ feedback occasion is configured for the first apparatus to send the HARQ feedback of the first sidelink HARQ process to a network device; and the HARQ feedback indicates whether the first data associated with the first sidelink HARQ process is successfully decoded by the second apparatus.

2. The method according to claim 1, further comprising:
    determining, by the first apparatus, that the HARQ feedback of the first sidelink HARQ process is NACK when any one of following conditions is met:
    a first feedback that is received by the first apparatus and sent by the second apparatus is NACK, wherein the first feedback indicates whether the first data associated with the first sidelink HARQ process is successfully decoded by the second apparatus or not;
    the first apparatus does not receive the first feedback sent by the second apparatus; or
    the first apparatus does not transmit the first data to the second apparatus on a first resource, wherein the first resource is a transmission resource scheduled by the network device for the first sidelink HARQ process.

3. The method according to claim 1, wherein the first sidelink HARQ process is associated with a first variable, and the first variable indicates whether receiving a previous transmission of the first sidelink HARQ process succeeds; and the first variable being NACK indicates that receiving the previous transmission of the first sidelink HARQ process fails.

4. The method according to claim 3, wherein starting the second timer comprises:
    starting, by the first apparatus, the second timer when the first timer expires and the first variable is NACK.

5. The method according to claim 1, wherein the first time unit comprises: a symbol or a slot.

6. The method according to claim 1, wherein a unit of timing of the first timer is a symbol, and a unit of timing of the second timer is a slot.

7. The method according to claim 6, wherein lengths of the symbol and the slot depend on a numerology parameter set of a bandwidth part (BWP) of a sidelink used to transmit the first data; or
    the lengths of the symbol and the slot depend on a numerology parameter set of a bandwidth part (BWP) of an uplink through which the HARQ feedback is sent by the first apparatus to the network device.

8. The method according to claim 1, further comprising: stopping, by the first apparatus, the second timer when the first apparatus detects a first PDCCH, wherein the first PDCCH schedules a transmission resource for the first sidelink HARQ process.

9. The method according to claim 1, wherein the first apparatus is a terminal device or a chip that is disposed on the terminal device.

10. The method according to claim 1, wherein the first apparatus is in a radio resource control (RRC) connected mode.

11. The method according to claim 1, wherein a sidelink is established between the first apparatus and the second apparatus.

12. The method according to claim 1, further comprising:
transmitting, by the first apparatus, the HARQ feedback to the network device in the HARQ feedback occasion of the first sidelink HARQ process, or
the first apparatus does not transmits the HARQ feedback to the network device in the HARQ feedback occasion of the first sidelink HARQ process.

13. The method according to claim 12, further comprising:
transmitting, by the first apparatus, data on a sidelink, or on an uplink in the HARQ feedback occasion of the first sidelink HARQ process, without transmitting the HARQ feedback to the network device in the HARQ feedback occasion of the first sidelink HARQ process.

14. The method according to claim 1, wherein values of the first timer and the second timer are configured by the network device for the first apparatus.

15. An apparatus, comprising a processor and a non-transitory memory, wherein the processor is coupled to the memory that stores instructions; and the processor is configured to invoke the instructions in the memory to perform:
starting a first timer associated with a first sidelink hybrid automatic repeat request (HARQ) process in a first time unit after a HARQ feedback occasion of the first sidelink HARQ process;
starting a second timer associated with the first sidelink HARQ process after expiry of the first timer and when a HARQ feedback of the first sidelink HARQ process is negative acknowledgement (NACK), wherein the HARQ feedback being NACK indicates that a first data associated with the first sidelink HARQ process is not successfully decoded by a second apparatus; and
monitoring a physical downlink control channel (PDCCH) during running of the second timer, wherein
the first sidelink HARQ process is used by the apparatus for transmission of the first data to the second apparatus; the HARQ feedback occasion is configured for the apparatus to send the HARQ feedback of the first sidelink HARQ process to a network device; and the HARQ feedback indicates whether the first data associated with the first sidelink HARQ process is successfully decoded by the second apparatus.

16. The apparatus according to claim 15, wherein the processor is configured to invoke the instructions in the memory, to further perform:
determining that the HARQ feedback of the first sidelink HARQ process is NACK when any one of following conditions is met:
a first feedback that is received by the apparatus and sent by the second apparatus is NACK, wherein the first feedback indicates whether the first data associated with the first sidelink HARQ process is successfully decoded by the second apparatus or not;
the apparatus does not receive the first feedback sent by the second apparatus; or
the apparatus does not transmit the first data to the second apparatus on a first resource, wherein the first resource is a transmission resource scheduled by the network device for the first sidelink HARQ process.

17. The apparatus according to claim 15, wherein the first sidelink HARQ process is associated with a first variable, and the first variable indicates whether receiving a previous transmission of the first sidelink HARQ process succeeds; and the first variable being NACK indicates that receiving the previous transmission of the first sidelink HARQ process fails.

18. The apparatus according to claim 17, wherein starting the second timer comprises:
starting the second timer when the first timer expires and the first variable is NACK.

19. The apparatus according to claim 15, wherein the first time unit comprises: a symbol or a slot.

20. The apparatus according to claim 15, wherein a unit of timing of the first timer is a symbol, and a unit of timing of the second timer is a slot.

* * * * *